(12) United States Patent
Horimai et al.

(10) Patent No.: US 7,706,233 B2
(45) Date of Patent: Apr. 27, 2010

(54) OPTICAL-DISK RECORDING METHOD, RECORDING APPARATUS AND REPRODUCING APPARATUS

(75) Inventors: Hideyoshi Horimai, Shizuoka (JP); Masaharu Kinoshita, Kanagawa (JP); Hozumi Tanaka, Aomori (JP); Takao Yamamoto, Tokyo (JP)

(73) Assignee: Optware Corporation, Kanagawa (JP)

( * ) Notice: Subject to any disclaimer, the term of this patent is extended or adjusted under 35 U.S.C. 154(b) by 626 days.

(21) Appl. No.: 10/393,517

(22) Filed: Mar. 20, 2003

(65) Prior Publication Data

US 2004/0184382 A1 Sep. 23, 2004

(51) Int. Cl.
*G11B 7/00* (2006.01)

(52) U.S. Cl. .................................. 369/103; 369/275.3

(58) Field of Classification Search .................. 369/103, 369/112.17, 110.02, 275.3; 359/24
See application file for complete search history.

(56) References Cited

U.S. PATENT DOCUMENTS

| | | | |
|---|---|---|---|
| 5,107,483 A * | 4/1992 | Nakajima et al. ........... | 369/108 |
| 5,790,620 A * | 8/1998 | Okazaki et al. ............. | 376/305 |
| 6,614,566 B1 * | 9/2003 | Curtis et al. ................ | 359/24 |
| 7,167,286 B2 * | 1/2007 | Anderson et al. ............ | 359/25 |
| 2002/0114027 A1 * | 8/2002 | Horimai ...................... | 359/11 |
| 2002/0154589 A1 * | 10/2002 | Tanaka et al. ............... | 369/103 |

* cited by examiner

*Primary Examiner*—Wayne R Young
*Assistant Examiner*—LaTanya Bibbins
(74) *Attorney, Agent, or Firm*—Fenwick & West LLP

(57) ABSTRACT

An optical-disk recording method, recording apparatus and reproducing apparatus are provided which are capable of continuously recording/reproducing a hologram with ultra-high density. In the case of recording a hologram to a holographic recording area, a holographic recording spot HSP on one track of the holographic recording area and a holographic recording spot HSP on a track adjacent thereto are recorded in circumferentially different positions. At least one holographic recording spot HSP is formed on each track, making the process continuous. Recording is made such that, provided that the holographic recording spot HSP has a diameter D and a multiplex number of holographic recording spots HSP is m, a pitch P between adjacent holographic recording spots HSP is P=D/m. Consequently, it is possible to efficiently record a hologram with density to a holographic recording area of an optical disk recording medium, and to achieve the density increase of holographic recording capacity.

5 Claims, 17 Drawing Sheets

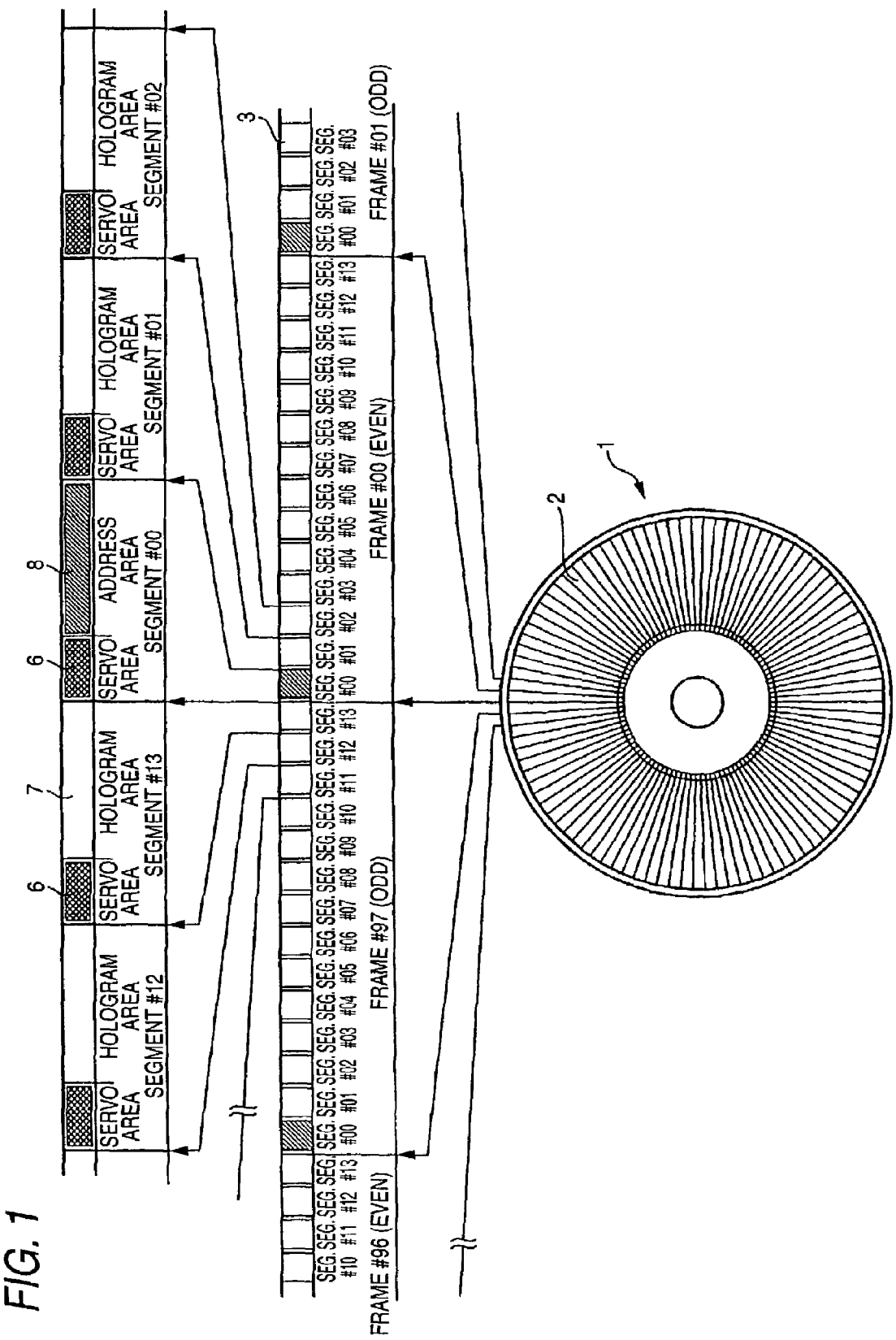

OPTICAL-DISK RECORDING METHOD, RECORDING APPARATUS AND REPRODUCING APPARATUS

BACKGROUND OF THE INVENTION

1. Field of the Invention

This invention relates to an optical-disk recording method, recording apparatus and reproducing apparatus using an optical disk recording medium having a plurality of servo areas circumferentially provided at a predetermined interval and holographic recording areas provided between the servo areas, and more particularly to an optical-disk recording method, recording apparatus and reproducing apparatus for continuously recording/reproducing information with ultra-high density by the utilization of holography.

2. Description of the Related Art

There is known a holographic recording scheme for recording, by hologram, information with ultra-high density onto an optical disk recording medium. In the holographic recording scheme, an interference fringe pattern is generated within the optical disk recording medium by superposing together an information light carrying image information and a recording reference light. By recording the interference fringe pattern in the optical disk recording medium, image information can be written. For reproducing information from the recorded interference fringe pattern, a reproducing reference light similar to the light of upon writing is irradiated to the interference infringe pattern recorded within the optical disk recording medium to cause diffraction due to an interference fringe pattern, thereby reproducing image information.

Recently, attentions are drawn to the development of volume holography having a recording density further increased by writing, in a three-dimensional fashion, an interference fringe pattern through utilization of a thickness direction of recording layer of the optical disk recording medium. The capacity of information recording can be drastically increased further by the multiplex recording with using such volume holography recording scheme.

International publication No. WO99/44195 discloses an apparatus and method for recording/reproducing information to/from an optical disk recording medium by such volume holography. In order to understand the present invention, explanation will be briefly made on the structure of a recording/reproducing apparatus utilizing volume holography described in that publication. As shown in FIG. 19, an optical disk recording medium 101 is structured with a holographic recording layer 101c provided between circular transparent substrates 101a, 101b, and a reflection film 111d formed on a surface of the transparent substrate 101b opposite to the recording layer 101c, wherein those are bonded on a substrate 10e. In the reflection film 101d, address servo areas are arranged plurally in radial direction of the optical disk recording medium 101 at a predetermined angular interval. Between the address servo areas arranged circumferentially, information recording areas are provided. The address servo area is previously recorded, by embossed pits, with information for focus servo control and tracking servo control as well as address information about information recording area. The information for tracking servo control can use, for example, wobble pits.

The optical disk recording medium concretely has a structure that the transparent substrate 101a, 101b has a suitable thickness, for example, of 0.6 mm or smaller and the holographic recording layer 101c has a suitable thickness, for example, of 10 µm or greater. The holographic recording layer 101c is formed of a holographic recording material which, when irradiated with a laser light for a predetermined time, optical characteristics of refractive index, dielectric constant, reflectivity and the like change depending upon a laser-light intensity. This uses, for example, Photopolymers HRF-600 (product name) by Dupont, or the like.

Recording to the holographic recording layer by volume holography, in one example, is as shown in the figure. Namely, an information light 111 carrying recording information and a recording reference light 112 are simultaneously irradiated at a side of the transparent substrate side 101a to produce an interference fringe in the thickness direction in the holographic recording layer 101c. Such irradiation is continued for a predetermined time to fix the interference fringe pattern in the holographic recording layer 101c, thereby recording information as a stereoscopic hologram.

In the meanwhile, in order to realize high-density recording using a general recording apparatus for optically recording information onto a disk-shaped optical disk recording medium, density increase can be achieved by narrowing the track pitch in information recording area of the optical disk recording medium. In holographic recording, however, the area of a holographic interference region (holographic recording spot) (e.g. $\phi 500$ µm) in holographic recording layer is greater compared to the track pitch (e.g. 0.8 µm). For density increase, there is a need for multiplex recording as stated before. It is a usual practice, as shown in FIG. 19, to record holographic recording spots onto the optical disk recording medium 101 by shifting the spots in the horizontal direction for each spot to have a partial overlap with the adjacent spot. In the multiplex recording like this, provided that the diameter of a holographic recording spot is D and the pitch between holographic recording spots is P, multiplex number m is given m=D/P.

However, in the multiplex recording, diffraction efficiency (reproduced light intensity) lowers in proportion to a square of the multiplex number m of hologram. Thus, there is a need to previously determine an optimal multiplex number with taking into account an improved recording density and secured reproduced light intensity, thereby determining based thereon a holographic recording spot pitch to the recording layer. Also in this case, the determined holographic recording spot pitch (P) itself (e.g. 20 µm) is greater relative to the track pitch in the information recording area of the optical disk recording medium. Consequently, in case holograms are to be successively written directly at the determined pitch P of holographic recording spots to the holographic recording layer 101c, recording is possibly made in such a burst fashion that recording is successful on a certain track but impossible on another track. There is a difficulty in continuously reproducing the hologram recorded in such a burst fashion as this.

It is an object of the present invention to provide an optical-disk recording method, recording apparatus and reproducing apparatus which are capable of continuously recording/reproducing a hologram with ultra-high density.

SUMMARY OF THE INVENTION

A recording method to an optical disk recording medium according to the present invention is, in a recording method to an optical disk recording medium having servo areas discretely formed at a predetermined interval in a circumferential direction to effect tracking servo and focus servo and generate a clock for an optical head, and holographic recording areas formed as mirror areas in an non-recoded state between the servo areas, the holographic recording areas recording, as a hologram, an interference pattern due to interference of an information light and recording reference light emitted from the optical head, a recording method to an optical disk recording medium characterized by comprising: recording holographic recording spots in the holographic recording areas such that a holographic recording spot on one track of the holographic recording area and a holographic recording spot on a track adjacent thereto are recorded in circumferentially different positions and, provided that the holographic recording spot has a diameter D and a preset multiplex number of holographic recording spots is m, a pitch P between adjacent holographic recording spots is P=D/m.

According to the recording method to an optical disk recording medium of the invention, because a holographic recording spot on one track of the holographic recording area and a holographic recording spot on a track adjacent thereto are recorded in circumferentially different positions, at least one holographic recording spot is formed on each track. Holographic recording and reproducing operations are not in a burst fashion but in a continuous process. Moreover, according to the recording method of the invention, recording is made such that, provided that the holographic recording spot has a diameter D and a multiplex number of holographic recording spots is m, a pitch P between adjacent holographic recording spots is P=D/m. Consequently, it is possible to efficiently record a hologram with density to a holographic recording area of an optical disk recording medium, and to achieve the density increase of holographic recording capacity.

Incidentally, in the recording method, it can be considered that a hologram is recorded in the holographic recording areas such that a spacing between a holographic recording spot recorded on one track in the holographic recording area and a holographic recording spot recoded on a track adjacent thereto is substantially P and that a holographic recording spot recoded on the one track and a holographic recording spot recorded on a track distant by m tracks therefrom are equal in circumferential position. By thus recording, process can be simplified while realizing recording with high density.

Meanwhile, in the recording method, a hologram may be recorded in the holographic recording areas such that a spacing between a holographic recording spot recorded on one track in the holographic recording area and a holographic recording spot recoded on a track adjacent thereto is substantially P and that a holographic recording spot recoded on the one track and a holographic recording spot recorded on a track distant by m tracks therefrom are deviated by P/2 in circumferential position. By thus recording, it is possible to realize recording with further increased density.

In the recording method like this, it is preferred that the optical disk recording medium is radially divided into a plurality of zones, a hologram being recorded in the holographic recording areas such that the number of holographic recording spots recorded circumferentially of the holographic recording area of one of the zones close to an outer periphery is greater than the number of holographic recording spots recorded circumferentially of the holographic recording area of one of the zones close to an inner periphery. This increases recording density.

An optical disk recording apparatus according to the invention is, in an optical disk recording apparatus for recording a hologram to an optical disk recording medium having servo areas discretely formed at a predetermined interval in a circumferential direction to effect tracking servo and focus servo and generate a clock for an optical head, and holographic recording areas formed as mirror areas in an non-recoded state between the servo areas, the holographic recording areas recording, as a hologram, an interference pattern due to interference of an information light and recording reference light emitted from the optical head, an optical disk recording apparatus comprising: clock generator for reading out information in the servo area of the optical disk recording medium by the optical head and generating a clock; and recording timing generator for generating a recording timing signal that determines a recording timing for each track with reference to a clock generated by the clock generator; the recording timing generator determining a recording timing of the hologram to the holographic recording areas such that a holographic recording spot on one track of the holographic recording area and a holographic recording spot on a track adjacent thereto are recorded in circumferentially different positions and, provided that the holographic recording spot has a diameter D and a preset multiplex number of holographic recording spots is m, a pitch P between adjacent holographic recording spots is P=D/m.

An optical disk reproducing apparatus according to the invention is, in an optical disk reproducing apparatus for reproducing an optical disk recording medium having servo areas discretely formed at a predetermined interval in a circumferential direction to effect tracking servo and focus servo and generate a clock for an optical head, and holographic recording areas recording, as a hologram, an interference pattern due to interference of an information light and recording reference light emitted from the optical head, an optical disk reproducing apparatus comprising: clock generator for reading out information in the servo area of the optical disk recording medium by the optical head and generating a clock; and reproducing timing generator for generating a reproducing timing signal that determines a reproducing timing for each track with reference to a clock generated by the clock generator; the reproducing timing generator determining a reproducing timing of the holographic recording spots to the holographic recording areas such that a holographic recording spot on one track of the holographic recording area and a holographic recording spot on a track adjacent thereto are recorded in circumferentially different positions and, provided that the holographic recording spot has a diameter D and a preset multiplex number of holographic recording spots is m, a pitch P between adjacent holographic recording spots is P=D/m.

BRIEF DESCRIPTION OF THE DRAWINGS

FIG. 1 is a view for explaining an optical disk recording medium to be used on an optical disk recording apparatus according to one embodiment of the present invention;

DESCRIPTION OF THE PREFERRED EMBODIMENTS

Embodiments of the present invention will now be explained with reference to the attached drawings.

Figure 2A:
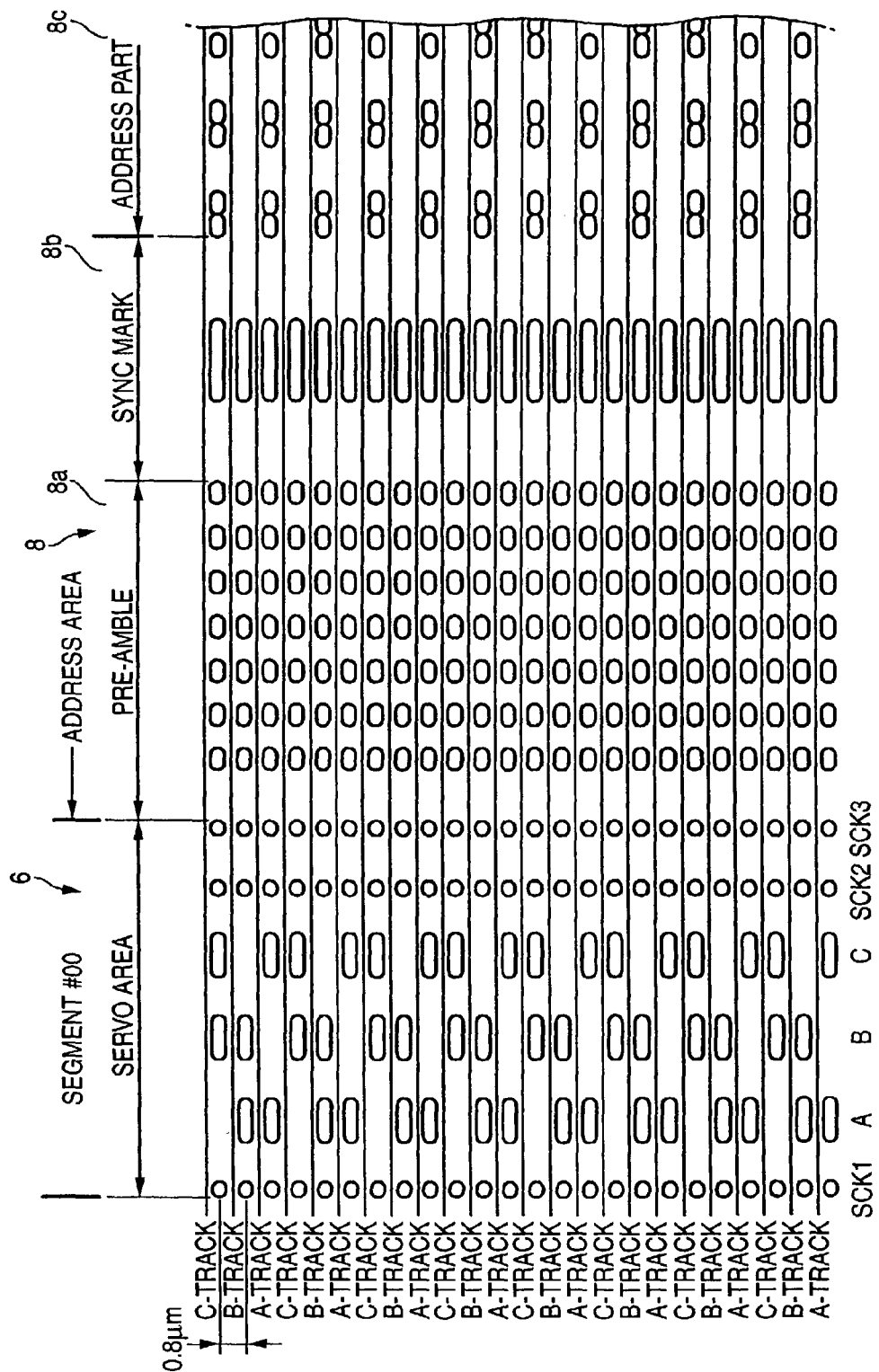
FIG. 2A is a fragmentary magnifying view of FIG. 1.
Figure 2B:
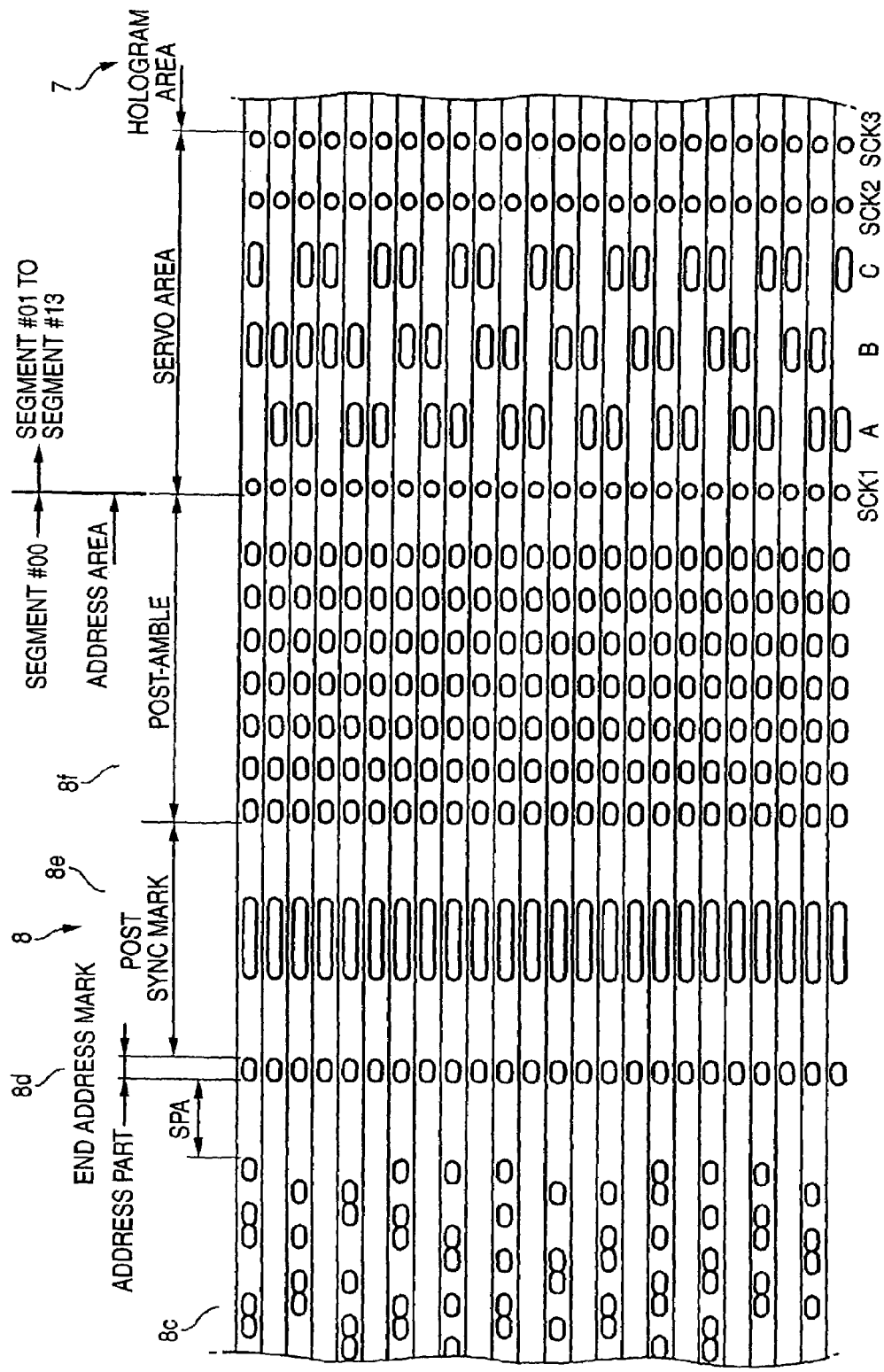
FIG. 2B is a fragmentary magnifying view of FIG. 1.

FIG. 1 is a figure for explaining an optical disk recording medium to be used on an optical disk recording apparatus according to one embodiment of the present invention. FIGS. 2A and 2B are fragmentary magnifying views of FIG. 1.

As shown in FIG. 1, a disk-formed optical disk recording medium 1 has a plurality of frames 2 (frames #00-#97, in the example) divided in a circumferential direction. Each of the frames 2 is configured with a plurality of segments 3 (segments #00-#13, in the example) further divided in the circumferential direction. Each segment 3 has a servo area 6 and a holographic recording area 7 excepting part of adjacent servo areas 6. In the part of adjacent servo areas 6 (servo area 6 of segment #00 and servo area 6 of segment #01, in this embodiment), formed is an address area 8 recording address information representative of an access position.

As shown in FIGS. 2A and 2B, each servo area 6 is previously recorded, by embossed pits or the like, with servo clock pits SCK 1, 2, 3 as a reference of timing for various operations of an optical disk recording/reproducing apparatus, and servo pits A, B, C for carrying out focus servo and tracking servo, for example, on the sampled servo scheme. The address area 8 is configured with a pre-amble 8a, a sync mark 8b, an address part 8c, an end address mark 8d, a post sync mark 8e and a post-amble 8f.

The address part 8c has pieces of address information, for identifying a holographic recording area 7, recorded on every other track. During recording a hologram, the information recoded on the address area 8 is utilized to align the irradiation position of an information light, recording reference light and reproducing reference light from an optical head relative to an information recorded position of each holographic recording area 7. The optical disk recording/reproducing apparatus carries out focusing and tracking by utilizing the servo clock pits SCK 1-3 and servo pits A, B, C recorded in the servo region 6. Also, the apparatus detects address information recorded in the address area 8, to align an irradiation position of an information light, a recording reference light and a reproducing reference light in each holographic recording area 7. The holographic recording area 7 is a mirror region free of a physical format formed by embossed pits.

Figure 3:
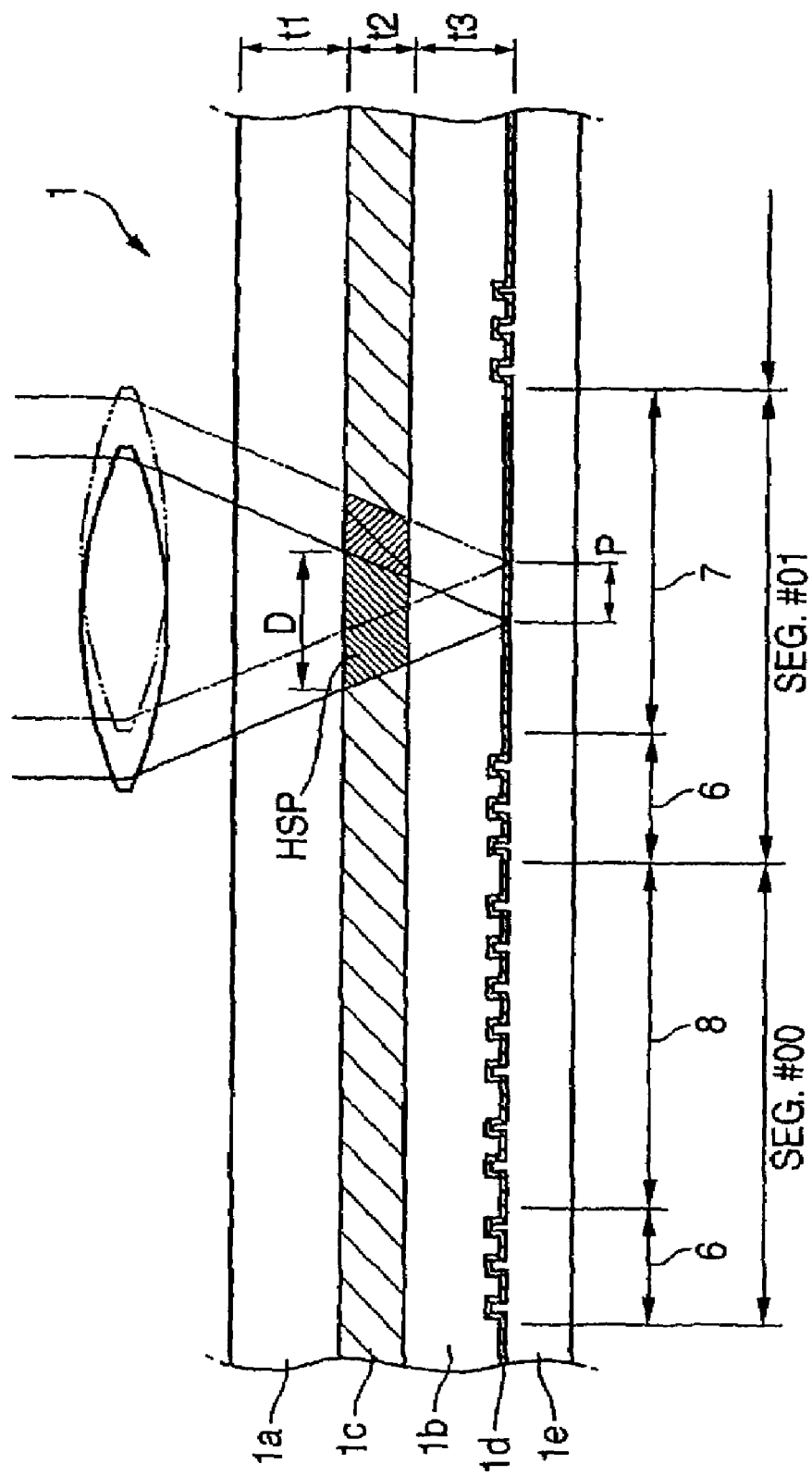
FIG. 3 is a magnifying, fragmentary sectional view of the same optical disk recording medium.

FIG. 3 is a magnifying, fragmentary sectional view of the optical disk recording medium 1.

The optical disk recording medium 1 is structured by bonding, on a substrate 1e, a holographic recording layer 1c provided between disk-shaped transparent substrates 1a, 1b, and a reflection film 1d formed on an opposite surface of the transparent substrate 1b to the recording layer 1c. The reflection film 1d, at its segment #00, is pre-formatted with the embossed pits of a servo area 6 and address area 8, as a physical format. At the segments #01-#13, only the embossed pits for the servo areas 6 are pre-formatted as a physical format. By thus using only one segment of fourteen segments for an address-information physical format, it is possible to secure the area of a mirror region for utilizing in holographic recording to a possible large extent. In the holographic recording area 7, holographic recording spots HSP, each having a diameter D, are recorded with horizontal shift at a pitch P in a manner partly overlapping with the adjacent spot HSP. This realizes multi-recording.

The optical disk recording medium, in a concrete structure, has a thickness t1, t3 of transparent substrate 1a, 1b set at 0.6 mm or smaller, for example, and a thickness t2 of holographic recording layer 1c at 10 μm or greater, for example. The holographic recording layer 1c is formed of a holographic recording material which, when irradiated by laser light for a predetermined time, there is change in optical characteristics such as refractive index, dielectric constant and reflectivity depending upon laser intensity. For example, Photopolymers HRF-600 (product name) by Dupont or the like is usable.

Next, explanation will be made in detail on the physical format of the servo area 6 and address area 8. As shown in FIGS. 2A and 2B, the servo clock pits are formed at both ends of the region where the servo pits A, B, C are formed. The servo clock pit SCK1 is formed, for one in number, at one end in the track direction while the servo clock pits SCK2, SCK3 are formed for two in number successively at the other end in the track direction. This is because, in order to enable bi-directional reading out in the track direction, the servo clock pits SCK1 and SCK2, SCK3 are made different in the formation number to determine directionality. By thus forming the servo clock pits SCK1, SCK2, SCK3, servo-clock information differs depending upon a difference of reading direction, making it possible to discriminate a read-out direction. This is a requisite function for executing a tracking servo process.

Figure 4:
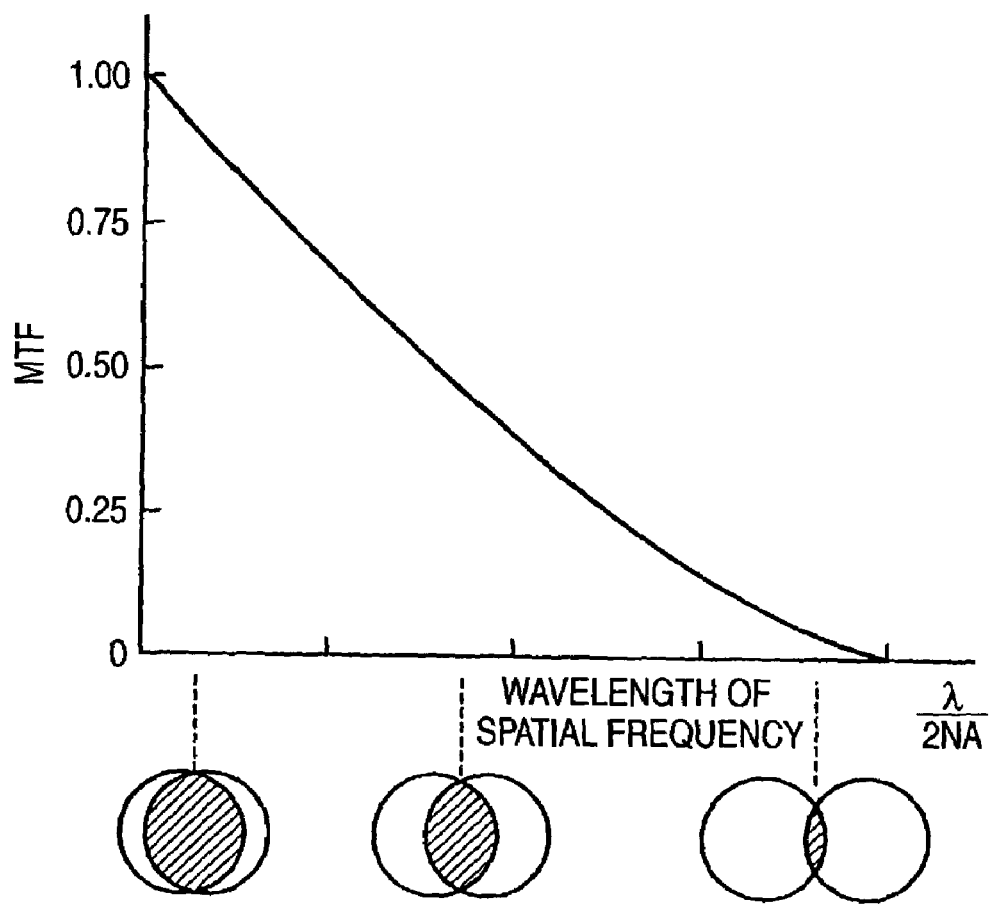
FIG. 4 is a graph showing a relationship between a pit spatial frequency and a modulation transfer function (MTF)

In the optical disk recording medium 1 of this embodiment, tracks are formed between the embossed pits. The servo clock pits SCK 1-3 have a radial pitch of arrangement equal to a track pitch (e.g. 0.8 μm). This is set to a spatial frequency (λ/2NA) at MTF=0 shown in FIG. 4. Due to this, the servo clock pits are to be optically seen as one groove with respect to the radial direction. An optical beam can be detected whatever position it may lie at a start of tracking. Incidentally, this point is true for the pre-amble 8a, the sync mark 8b, the end address mark 8d, the post sync mark 8e and the post-amble 8f of the address area 8.

Figure 5:
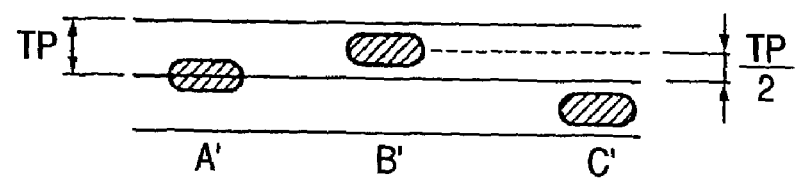
FIG. 5 is a figure for explaining the conventional servo pit.
Figure 6A:
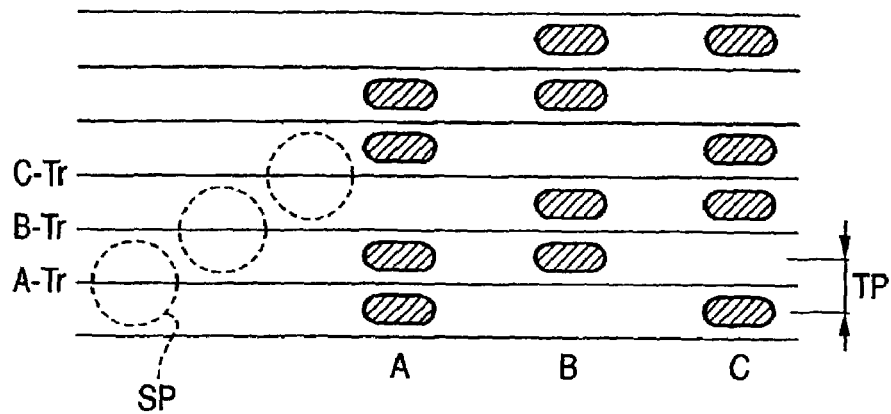
FIG. 6 is a figure for explaining the servo pit formed in the same optical disk recording medium.

The servo pit A, B, C are introduced for realizing sampled servo. Namely, in case of carrying out sampled servo with a servo pit A' formed in an on-track position and servo pits B', C' arranged left and right with respect to the track extension as shown in FIG. 5, the pits A', B', C' must be formed at a ½ track pitch (TP), thus increasing manufacture cost. On the contrary, in the scheme of this embodiment, every pit is formed between the tracks as shown in FIG. 6A. Because on-track position is to be detected by a pair of two adjacent pits, the accuracy of forming pits is at a track pitch (TP), reducing manufacture cost correspondingly.

Figure 6B:
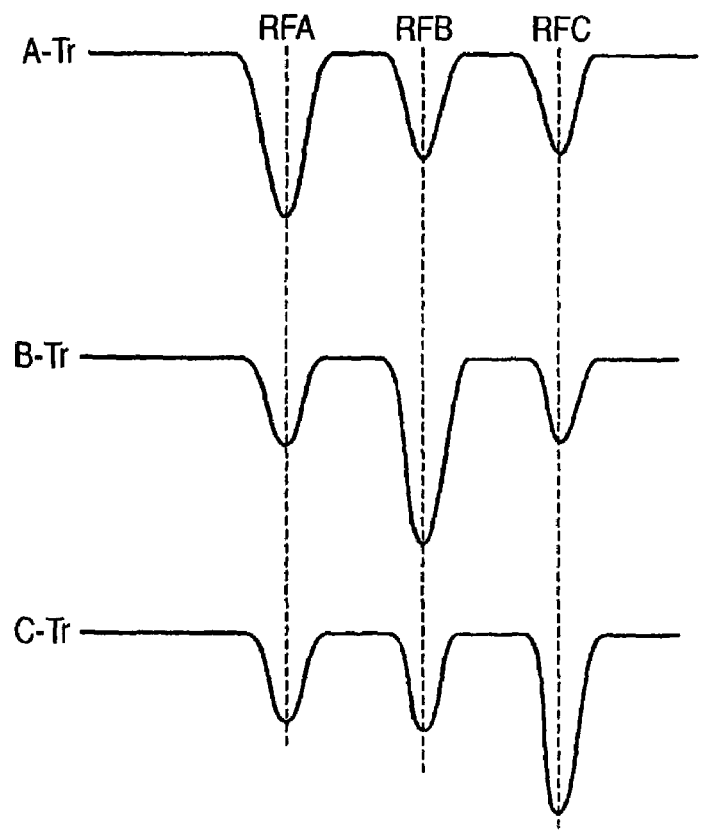

In FIG. 6A, when an optical beam spot SP is on an A-track (A-Tr), the optical beam spot SP first detects two pits A and then pits B, C each one at a time. Accordingly, as shown in FIG. 6B, the first detection signal RFA is the maximum, and the succeeding second and third detection signals RFB, RFC are nearly in an equal amplitude smaller than RFA. Consequently, in this case, by taking a peak value of the smaller amplitude detection signal RFB, RFC as a sample hold to subtract the both, a tracking error signal TE is obtained.

Next, the address part 8c will be explained.

Figure 7:
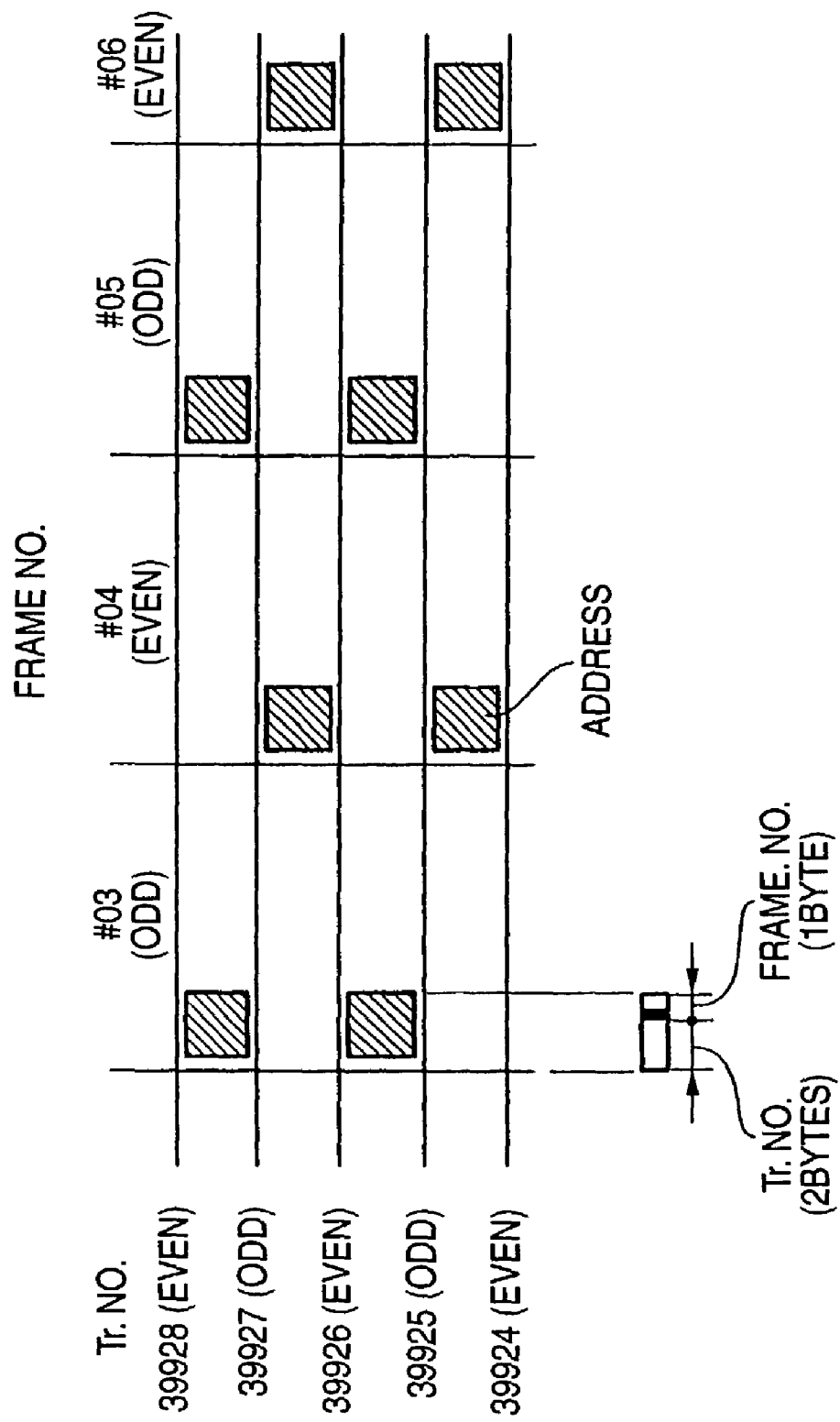
FIG. 7 is a figure showing an arrangement relationship between the track, the frame and address information of the same optical disk recording medium.

In the address part 8c, address information is recorded on every other track. FIG. 7 shows an arrangement relationship of between a track, a frame and address information. As shown in this figure, on the odd-numbered track (more correctly, in the outer side of the odd-numbered track), address information is recorded on the odd-numbered frame. On the even-numbered track (more correctly, in the outer side of the even-numbered track), address information is recorded on the even-numbered frame. The address information comprises, for example, 2-byte track number information and 1-byte frame number information. During accessing an odd-numbered track, track information and frame information are referred from an address area 8 of odd-numbered frame while frame information only is referred from an address area 8 of even-numbered frame without making reference to track information. Similarly, during accessing an even-numbered track, track information and frame information are referred from an address area 8 of even-numbered frame while frame information only is referred from an address area 8 of odd-numbered frame without making reference to track information. By such address reference, even where track density reaches a spatial frequency at MTF=0, the spatial frequency can be decreased in the radial direction. This makes it possible to make an address reference without any obstruction.

Next, explanation is made on a holographic recording format (logic format) to the holographic recording area 7.

Figure 8:
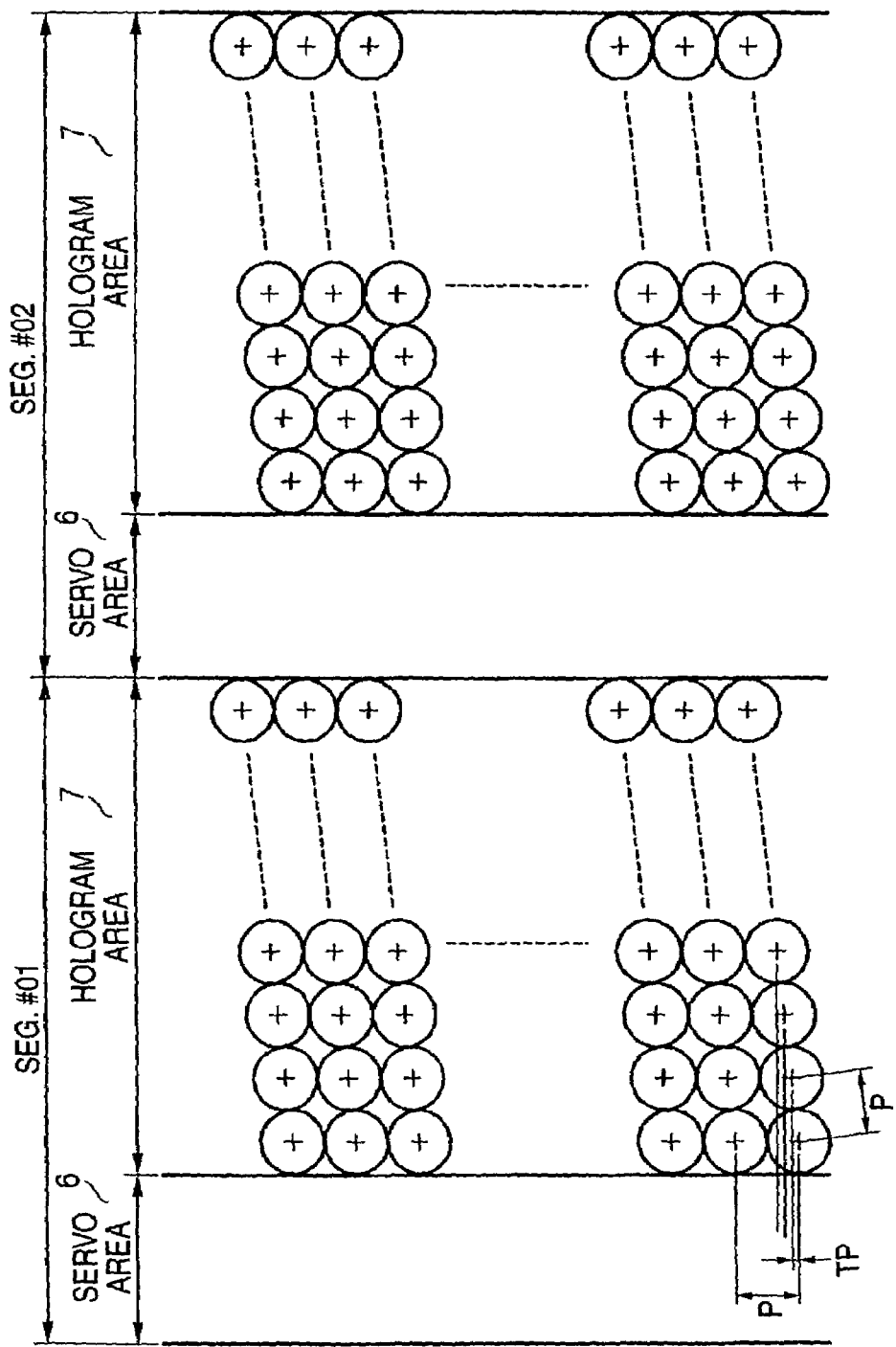
FIG. 8 is a figure for explaining a holographic recording format.

FIG. 8 is a figure for explaining a holographic recording format. Incidentally, the circle shown in the figure represents a recorded position center of a holographic recording spot for the convenience of explanation, wherein attention should be paid in that it does not represent a holographic recording spot.

As also shown in FIG. 3, the holographic recording spot HSP has a diameter D extremely great as compared to the track pitch TP (0.8 μm, in the example). It is now assumed that the diameter D of the holographic recording spot HSP is 500 μm and the multiplex number m is 25, then the recording pitch P of holographic recording spots HSP is given D/m=20 μm. Accordingly, in case holographic recording spots HSP are continuously formed at a pitch of 20 μm over one track, the track next to be recorded is a track preceded by 25 tracks. In this case, continuous recording/reproducing is impossible.

For this reason, in this embodiment, in case a holographic recording spot HSP is formed on one track, then a holographic recording spot HSP on the next track is recorded in a position shifted by the pitch (=20 μm) in the track direction. After repeating this sequentially, on a track preceded by m (=25) tracks, a holographic recording spot HSP is formed in the same radial position as the first track. Due to this, because at least one holographic recording spot is recorded or reproduced without exception on each track, continuous processing is made possible.

Figure 9:
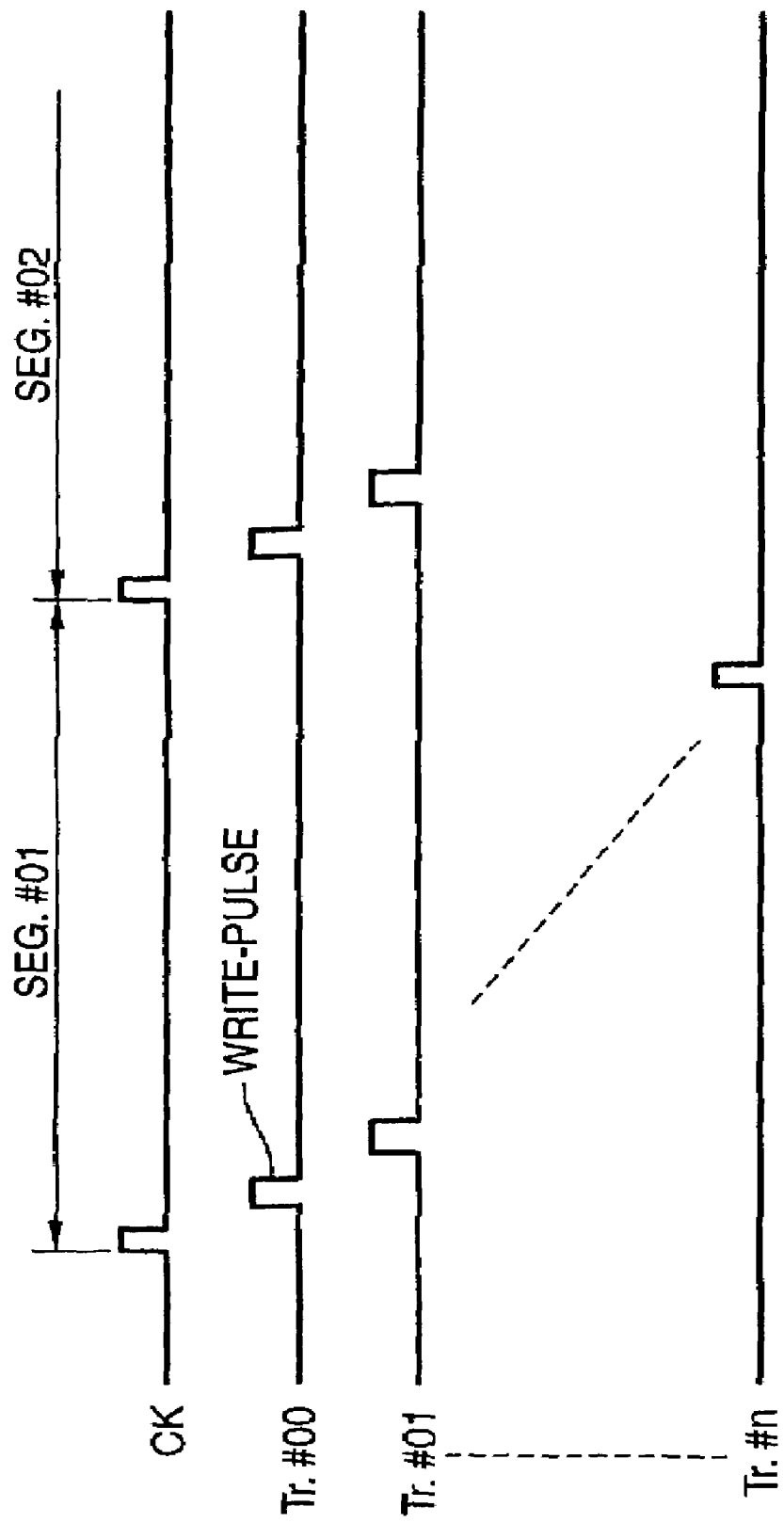
FIG. 9 is a timing chart showing a recording pulse for providing a timing for recording.

FIG. 9 shows a recording pulse to provide a timing of recording. With reference to a servo clock CK reproduced from the servo clock pit SCK1 of the servo area 6, write timing is provided with shift from track to track #00, #01, . . . , #n. The amount of shift corresponds to the pitch P.

Figure 10:
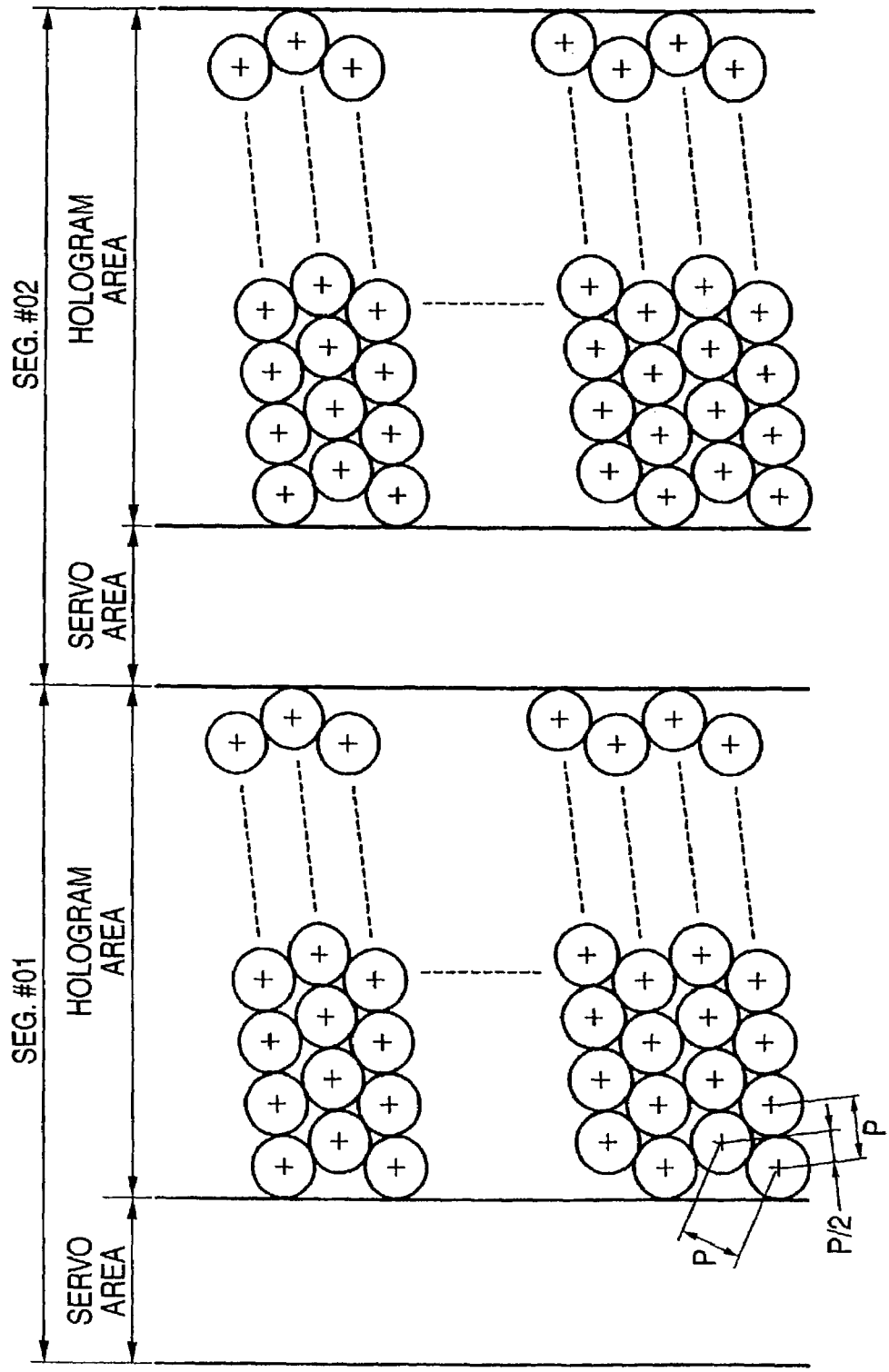
FIG. 10 is a figure for explaining another embodiment of holographic recording format.

FIG. 10 is a figure showing another embodiment of a holographic recording format. In this embodiment, arrangement is with a shift by approximately P/2 between the radially adjacent rows of holographic recording spots. With this arrangement, holographic recording spots can be arranged with further increased density.

Figure 11:
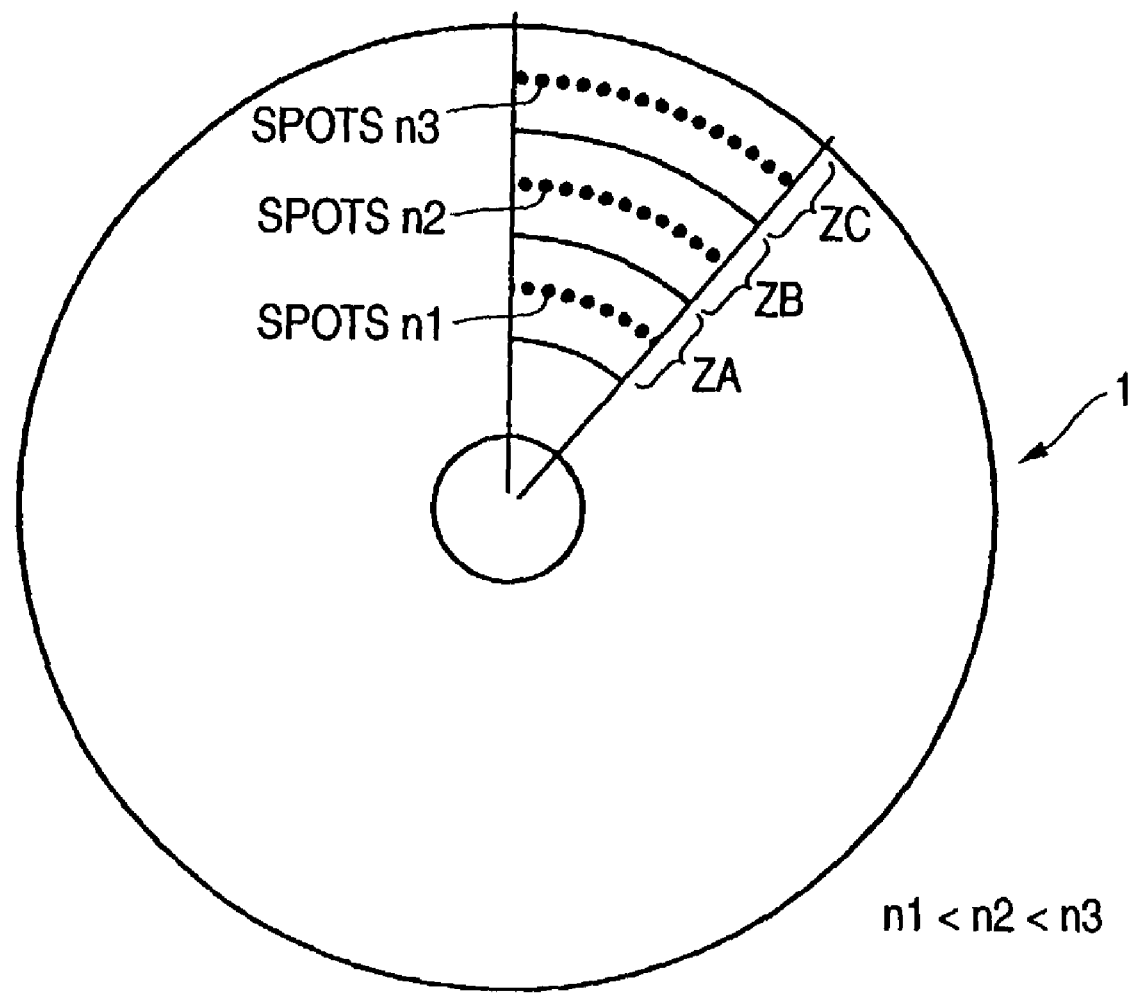
FIG. 11 is a figure showing the zones formed on the same optical disk recording medium.

Incidentally, as shown in FIG. 11, the optical disk recording medium 1 may be radially formed with a plurality of zones ZA, ZB, ZC so that the closer to the outer periphery the zone is, the more holographic recording spots HSP are recorded on the zone, e.g. n1<n2<n3 (wherein, n1: spots in ZA, n2: spots in ZB, n3: spots in ZC). Such arrangement further increases the recording density.

Figure 12:
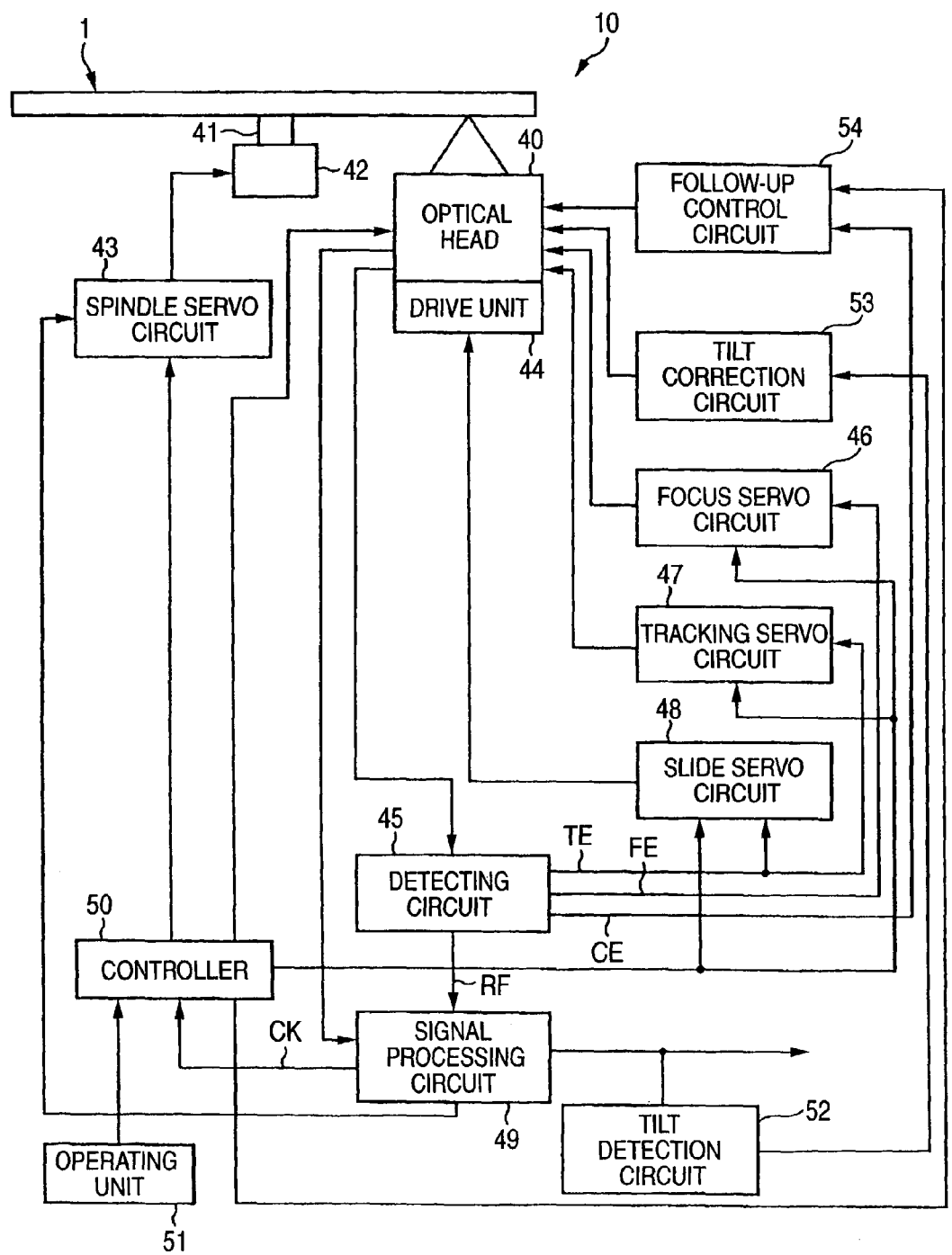
FIG. 12 is a block diagram schematically showing a configuration of an optical disk recording/reproducing apparatus according to one embodiment of the invention.

FIG. 12 is a block diagram schematically showing a configuration of an optical disk recording/reproducing apparatus according to one embodiment of the invention.

The optical disk recording/reproducing apparatus 10 has a spindle 41 on which an optical disk recording medium 1 is to be mounted, a spindle motor 42 for rotating the spindle 41, and a spindle servo circuit 43 for controlling the spindle motor 42 to keep the rotation speed of an optical disk recording medium 1 at a predetermined value. Also, the optical disk recording/reproducing apparatus 10 has an optical head 40 for irradiating with information light and recording reference light an optical disk recording medium 1 to record a hologram in the holographic recording area 7 and irradiating with reproducing reference light the optical disk recording medium 1 having holographic data, to detect a reproduction light and reproduce original information from the holographic data recorded in the holographic recording area 7 of the optical disk recording medium 1, and a drive unit 44 for driving the optical head 40 radially of the optical disk recording medium 1.

The optical disk recording/reproducing apparatus 10 has a detecting circuit 45 for detecting a focus error signal FE, tracking error signal TE, tracing error signal CE and reproducing signal RF from an output signal from the optical head 40, and a focus servo circuit 46 for carrying out focus servo control by vertically moving a hereinafter-referred optical head main body relative to a surface of the optical disk recording medium 1 during passing of the optical head 40 over the servo area 6 on the basis of a focus error signal FE detected by the detecting circuit 45 and command from the controller 50. There are also provided a tracking servo circuit 47 for carrying out tracking servo control by moving the optical head main body radially of the optical disk recording medium 1 during passing of the optical head 40 over the servo area 6 on the basis of a focus error signal FE detected by the detecting circuit 45 and command from the controller 50, and a tracing servo circuit 55 for carrying out tracing servo control by moving the optical head main body in a moving direction of the optical disk recording medium 1 and irradiating information light and recording reference light to follow the information recording position of the holographic recording area 7 without positional deviation for a predetermined time during passing of the optical head 40 over the holographic recording area 7 on the basis of a tracing error signal CE detected by the detecting circuit 45 and command from the controller 50. Furthermore, there are provided a slide servo circuit 48 for slide servo control to control the drive circuit 44 on the basis of a tracking error signal TE and a command from the controller 50 to move the optical head 40 radially of the optical disk recording medium 1, and a follow-up control circuit 54 for causing the optical head 40 to follow to a desired information recording position on the basis of a command from the controller 50 during passing of the optical head 40 over the servo area 6.

Also, the optical disk recording/reproducing apparatus 10 has a signal processing circuit 49 for decoding the output data of a hereinafter-referred CCD array of within the optical head 40 to reproduce the hologram recorded in the information recording position of the holographic recording area 7 of the optical disk recording medium 1 and reproducing a basic clock by a reproducing signal RF from the detecting circuit 45 to supply a clock signal to the controller 50, a controller 50 for controlling the overall operation of the optical disk recording/reproducing apparatus 10, and an operating section 51 for providing various instructions to the controller 50.

Furthermore, the optical disk recording/reproducing apparatus 10 has an inclination detecting circuit 50 for detecting a relative inclination of the optical disk recording medium 1 and optical head main body on the basis of an output signal of the signal processing circuit 49, and a tilt correction circuit 53 for changing the position of the optical head main body toward a direction of changing the optical head main body tilt relative to the surface of the optical disk recording medium 1 on the basis of an output signal of the inclination detecting circuit 52 to thereby correct the relative inclination of the optical disk recording medium 1 and optical head main body.

Figure 13:
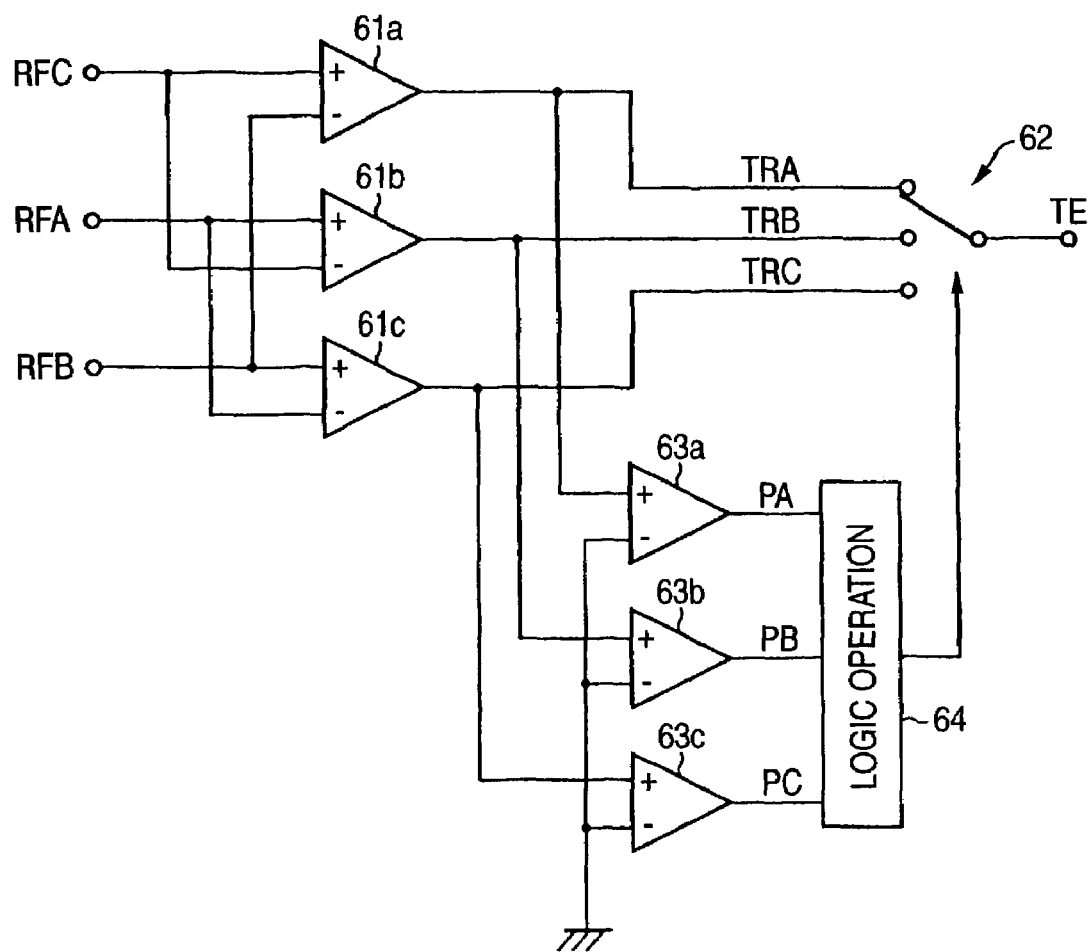
FIG. 13 is a figure showing a configuration of a part concerning a tracking error detecting circuit of a signal processing circuit of the same apparatus.

Of the signal processing circuit 49, the part relating to the tracking error detecting circuit is configured, for example, as shown in FIG. 13. By the respective differential amplifiers 61a, 61b, 61c, mutual differences are determined of the values RFA, RFB, RFC obtained by sample-holding the peak values, at the time points of A, B, C, of the RF signal from the detecting circuit 45 with reference to the servo clock CK. The respective outputs TPA, TPB, TPC of the differential amplifiers 61a, 61b, 61c are selected by a multiplexer 62, to output a tracking error signal TE. The polarities of outputs of the differential amplifiers 61a, 61b, 61c are respectively detected by the comparators 63a, 63b, 63c. On the basis of the output PA, PB, PC of the comparators 63a, 63b, 63c, a logic operation circuit 64 switch-controls the multiplexer 62. Due to this, a differential of two small peak values, shown in FIG. 6B, is outputted as a tracking error signal TE. Incidentally, the tracking error signal TRA, TRB, TRC has a dynamic range resulting from the diffraction at two servo pits 65 as shown in FIG. 2A, which can be a greater value as compared to that of the conventional optical disk. In other words, it is possible to obtain a tracking error signal TE having a favorable S/N ratio (signal-to-noise ratio).

The optical disk recording/reproducing apparatus 10, has the follow-up control circuit 54 for controlling an irradiation position of information light and recording reference light such that the irradiation position of information light and recording reference light follows up one information recording position of the moving holographic recording area 7 for a predetermined time by moving the optical head main body in a direction nearly along the track when the optical head 40 passes the servo area 6 during holographic recording. However, the present embodiment carries out tracing servo control so that the irradiation position of information light and recording reference light can trace an information recording position with further precision and accuracy. Namely, the detecting circuit 45 detects, as a tracing error signal CE, a positional deviation in a moving direction of the optical disk recording medium 1 between an information recording position of the holographic recording area 7 and an irradiation position of information light and recording reference light by irradiating with a tracing-servo laser beam the servo clock pits SCK 1-3. The tracing servo circuit 55 is provided to carry out tracing servo for causing the optical head main body, even within a holographic recording area 7, to move in the moving direction of the optical disk recording medium 1 on the basis of that tracing error signal CE.

The controller 50 is inputted by a servo clock CK or address information outputted from the signal processing circuit 49, to control the optical head 40, the spindle servo circuit 43, the slide servo circuit 48, the focus servo circuit 46, the tracking servo circuit 47, the tracing servo circuit 55, the follow-up control circuit 54 and so on. The spindle servo circuit 43 is inputted by a basic clock outputted from the signal processing circuit 49. The controller 50 has a CPU (central processing unit), a ROM (read only memory) and a RAM (random access memory). The CPU executes the program stored in the ROM by using the RAM as a working area, thereby realizing the function of the controller 50.

Explanation will now be made on one example of an optical system 11 of the optical head 40 of the optical disk recording/reproducing apparatus according to this embodiment, with reference to FIG. 14.

In holographic recording on the optical disk recording medium 1, the divergent laser light emitted from a laser source 25 is focused by a lens 24 to form a laser beam. The laser beam is split into two laser beams by using a half mirror 30a, one of which is utilized for the information light modulated by recording information while the other is utilized as a recording reference light for forming an interference pattern. Namely, holographic recording is made by irradiating with information light and recording reference light the holographic recording layer 1c of the optical disk recording medium 1 for a predetermined time such that a three-dimensional interference fringe pattern is formed in the holographic recording layer 1c due to interference between the information light and the recording reference light. In order to irradiate with information light and recording reference light one information recording position in the holographic recording layer 1c of the optical disk recording medium 1 for a predetermined time, the movement of optical disk recording medium 1 and the movement of optical head 40 irradiation position are placed in synchronization for a predetermined time.

Namely, there is a necessity of movement with correct synchronization for a time required for exposure to light. Consequently, this embodiment is provided with the servo clock pits SCK1-3 in the servo region 6. By irradiating the servo clock pits SCK1-3 with a tracing laser beam having a wavelength different from the wavelength of a holographic-recording laser beam, detected is a positional deviation between an information recording position and an irradiation position of information light and recording reference light. During holographic recording, tracing servo control is carried out for movement by correctly positioning between an information recording position of holographic recording area 7 and an irradiation position of information light and recording reference light. Also, reproducing a recorded hologram is carried out by irradiating the holographic recording layer 1c with reproducing reference light in place of interference-pattern-forming recording reference light.

Figure 14:
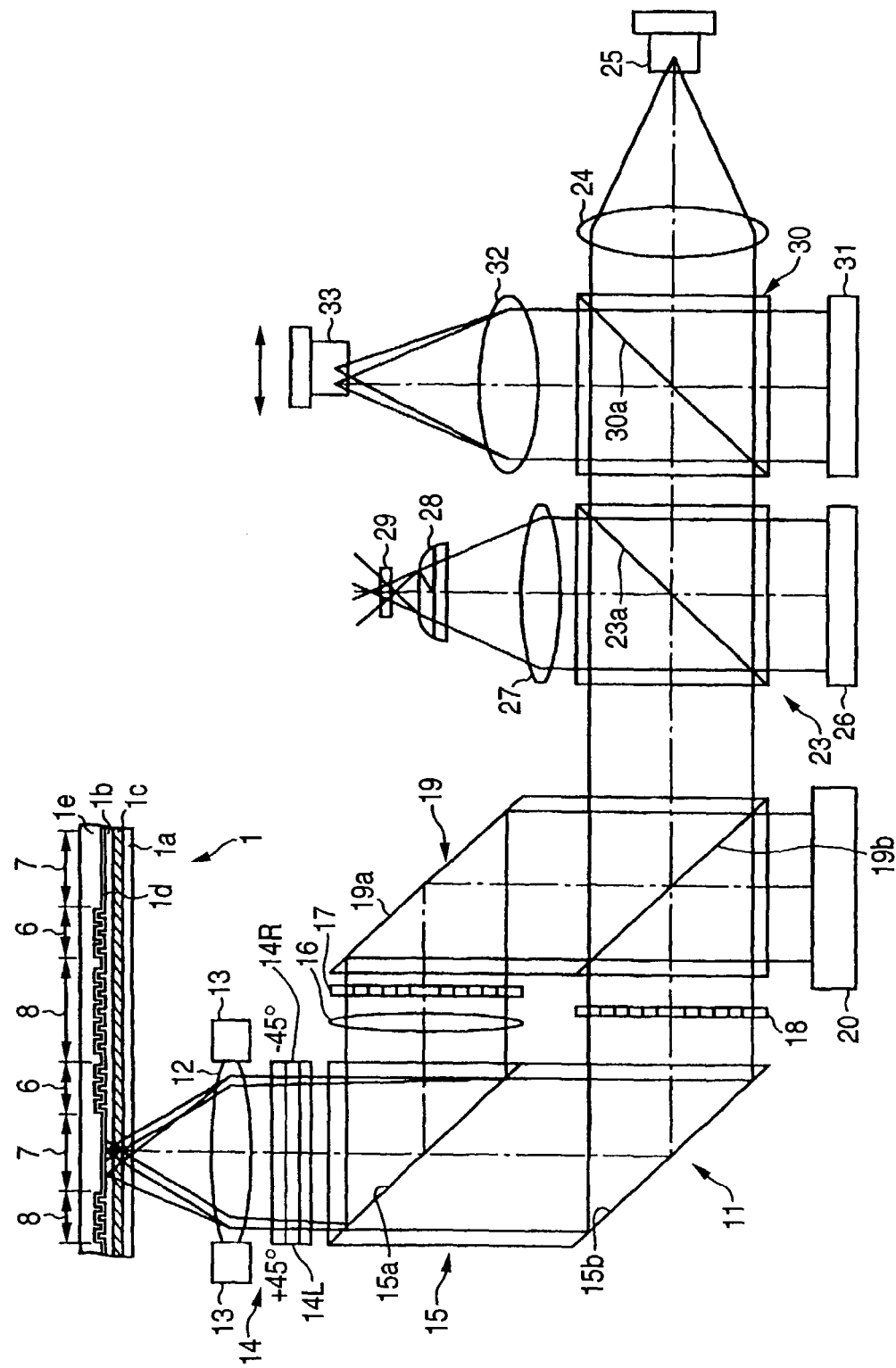
FIG. 14 is a schematic figure showing an example of an optical part of an optical head of the same apparatus and showing the principle of an optical part of an optical head to be used on the same apparatus.

FIG. 14 shows one example of optical system, which is a schematic diagram showing the principle of the optical part of the optical head to be used on the optical disk recording/reproducing apparatus of the embodiment. The recording/reproducing optical system, or optical head 11, of this example is made up with an objective lens 12 opposed to an optical disk recording medium 1, an actuator 13 for moving the objective lens 12 in thickness and radial directions of the optical disk recording medium 1, and, on a light-source side of the objective lens 12, a two-split optical rotatory plate 14 and a prism block 15 arranged in the closer order to the objective lens 12. The two-split rotatory plate 14 is formed with a rotatory plate 14L arranged on a left side of the optical axis and a rotatory plate 14R arranged on a right side of the optical axis. The rotatory plate 14L rotates the polarization direction of a laser beam by +45 degrees while the rotatory plate 14R rotates the polarization direction of a laser beam by −45 degrees. The prism block 15 has a half mirror 15a and a total reflection mirror 15b in the closer order to the two-split rotatory plate 14. The half mirror 15a and the total reflection mirror 15b are arranged such that the normal lines thereof both incline 45 degrees toward the same direction relative to the optical axis of the objective lens 12.

Laterally of the prism block 15, another prism block 19 is further arranged parallel therewith. A total reflection mirror 19a of the prism block 19 is arranged parallel with and opposite to the half mirror 15a of the prism block 15. Similarly, a half mirror 19b of the prism block 19 is arranged parallel with and opposite to the total reflection mirror 15b of the prism block 15. Laterally of the prism block 19, further arranged are a prism block 23 having a half mirror 23a and a prism block 30 having a half mirror 30a.

A convex lens 16 and a phase space optical modulator 17 are arranged between the half mirror 15a of the prism block 15 and the total reflection mirror 19a of the prism block 19, while a space optical modulator 18 is arranged between the total reflection mirror 15b of the prism block 15 and the half mirror 19b of the prism block 19. The phase space optical modulator 17 has a multiplicity of fine divisions arranged in a lattice form to change the phase of a passing laser beam based on each fine division, thereby structurally making it possible to spatially modulate the phase of a passing laser beam. This is to generate a reference light of upon forming or reading out a hologram, and can be easily realized by the use of liquid crystal device.

On the other hand, the space optical modulator 18 serves as information light generator. This has a structure comprising a multiplicity of fine divisions arranged in a lattice form, similarly to the optical modulator 17. By selecting a passing state and a blocking state of laser beam based on each fine division depending upon recording information, the intensity of laser beam can be spatially modulated to generate an information light carrying information. This space optical modulator 18 also can employ a liquid-crystal device, similarly to the phase space optical modulator 17.

The light source of the optical head 11 has a laser source 25 for recording/reproducing holograms, a laser source 33 for tracing servo, and collimator lenses 24, 32 for converging a coherent divergent laser light to a collimated bundle of rays. The half mirrors 23a, 30a respectively provided on prism blocks 23, 30 are inclined 45 degrees in its normal-line direction with respect to the optical axis of the collimator lens 24, 32. Part of the projection light, from the laser source 25, 33 passing the half mirror 23a, 30a, is directed to a photodetector 26, 31. The output of the photodetector 26, 31 serves to automatically adjust a light output from the light source 25, 33.

The return beam, from the optical disk recording medium 1, is reflected by the half mirror 23a and passed through a convex lens 27 and cylindrical lens 28 provided on the opposite side to the photodetector 26, to reach a four-split photodetector 29. During passing of the optical head 40 over the address servo area 6, a focus error signal FE and a tracking error signal are detected and a reproducing signal RF is drawn out. The detected focus error signal FE is used for focus servo control on the optical head 40, while the tracking error signal TE is used to effect tracking servo control on the optical head 40.

In this embodiment, when the optical head 40 passes the holographic recording area 7, a tracing error signal CE is detected thereby effecting tracing servo control of the optical head 40. Accordingly, the irradiation position of a tracing-servo laser beam to the servo clock pit can be moved by displacing the emission position of the tracing-servo laser source from the optical axis of the collimator lens 32 depending upon a holographic recording form. Accordingly, while irradiating with a tracing-servo laser beam onto the servo clock pits SCK1-3 to detect a tracing error signal CE and effect tracing servo control, holographic recording can be structurally done by irradiating with a holographic-recording laser beam an information recording position.

Explanation will be now made on the operation outline of upon recording a hologram. In FIG. 14, during recording a hologram, the space optical modulator 18 selects a transmission state (hereinafter, referred also as "on") and a blocking state (hereinafter, referred also as "off") for each pixel in accordance with recording information, to spatially modulate a passing laser beam thereby generating an information light. In this embodiment of the invention, 1-bit information is expressed by two pixels without exception, i.e. one of two pixels corresponding to 1-bit information is assumed on and the other off.

Meanwhile, the phase space optical modulator 17 selectively provides a passing laser beam with a phase difference of 0 (rad) to π (rad) with reference to a predetermined phase, on a pixel-by-pixel basis, according to a predetermined modulation pattern. Due to this, the phase of laser beam is spatially modulated to generate a recording reference light in which the laser beam is spatially modulated in phase. The controller 50 provides the phase space optical modulator 17 with the information of a modulation pattern selected by itself according to a predetermined condition or a modulation pattern selected by the operating section 51. The phase space optical modulator 17 spatially modulates the phase of a passing laser beam, according to the information of a modulation pattern provided by the controller 50 or selected by the operating section 51.

The laser beam to be outputted from the laser source 25 is made to a pulse-formed high output for recording. Incidentally, the controller 50 predicts a timing when the laser beam having exited the objective lens 12 passes the holographic recording area 7 depending upon the basic clock reproduced from the reproduction signal RF, and maintains the above setting during passing of the exited light from the objective lens 12 through the holographic recording area 7. Furthermore, while the laser beam from the objective lens 12 passes the holographic recording area 7, tracing servo only is carried out without effecting focus servo control and tracking servo control. Meanwhile, in the below explanation, the laser source 25 assumably emits a P-polarized light.

As was shown in FIG. 14, the P-polarized laser light emitted from the laser source 25 is changed by the collimator lens 24 into a collimated laser beam. This laser beam passes the beam splitter 30 and enters the beam splitter 23, part of whose light amount transmits through the half mirror 23a and enters the prism block 19. The laser beam incident on the prism block 19 has light amount, part of which transmits the half mirror 19b and passes the space optical modulator 18, whereupon it is spatially modulated according to recording information thus turned into information light.

This information light is reflected upon the total reflection surface 15b of the prism block 15, part of whose light transmits through the half mirror 15*a* and passes the two-split optical rotatory plate 14. Herein, the laser beam having passed the rotatory plate 14L of the two-split optical rotatory plate 14 is rotated +45 degrees in polarization direction and turned into a A-polarized laser beam while the laser beam having passed the rotatory plate 14R is rotated −45 degrees in polarization and turned into a B-polarized laser beam. The A-polarized and B-polarized information light, having passed the two-split optical rotatory plate 14, is irradiated onto the optical disk recording medium 1 such that it is converged on a boundary plane between the holographic recording layer 1*c* of the optical disk recording medium 1 and the substrate 4, i.e. on the reflection film 1*d*.

On the other hand, the laser beam reflected by the half mirror 19*b* of the prism block 19 is reflected upon the total reflection mirror 19*a* to pass the phase space optical modulator 17, whereupon the phase of light is spatially modulated into a recording reference light according to a predetermined modulation pattern. This recording reference light is passed through the convex lens 16 and converged, part of whose light is reflected by the half mirror 15*a* of the prism block 15 and passed the two-split optical rotatory plate 14.

Herein, the A-polarized and B-polarized recording reference light having passed the two-split optical rotatory plate 14, that the laser beam having passed the rotatory plate 14L of the two-split optical rotatory plate 14 has been rotated +45 degrees in polarization direction and turned into the A-polarized laser beam and the laser beam having passed the rotatory plate 14R has been rotated −45 degrees in polarization direction and turned into the B-polarized laser beam, is irradiated onto the optical disk recording medium 1, wherein it is once converged by the objective lens 12 in front of the boundary plane between the holographic recording layer 1*c* and the substrate 4 and then passed, while diverging, through the inside of the holographic recording layer 1*c*.

Briefly explaining herein on light polarization for easier understanding, A-polarized light is a linearly polarized light in which S-polarized light has rotated −45 degrees or P-polarized light has rotated +45 degrees. B-polarized light is a linearly polarized light in which S-polarized light has rotated +45 degrees or P-polarized light has rotated −45 degrees. Thus, A-polarized light and B-polarized light are orthogonal in polarization direction to each other.

Figure 15:
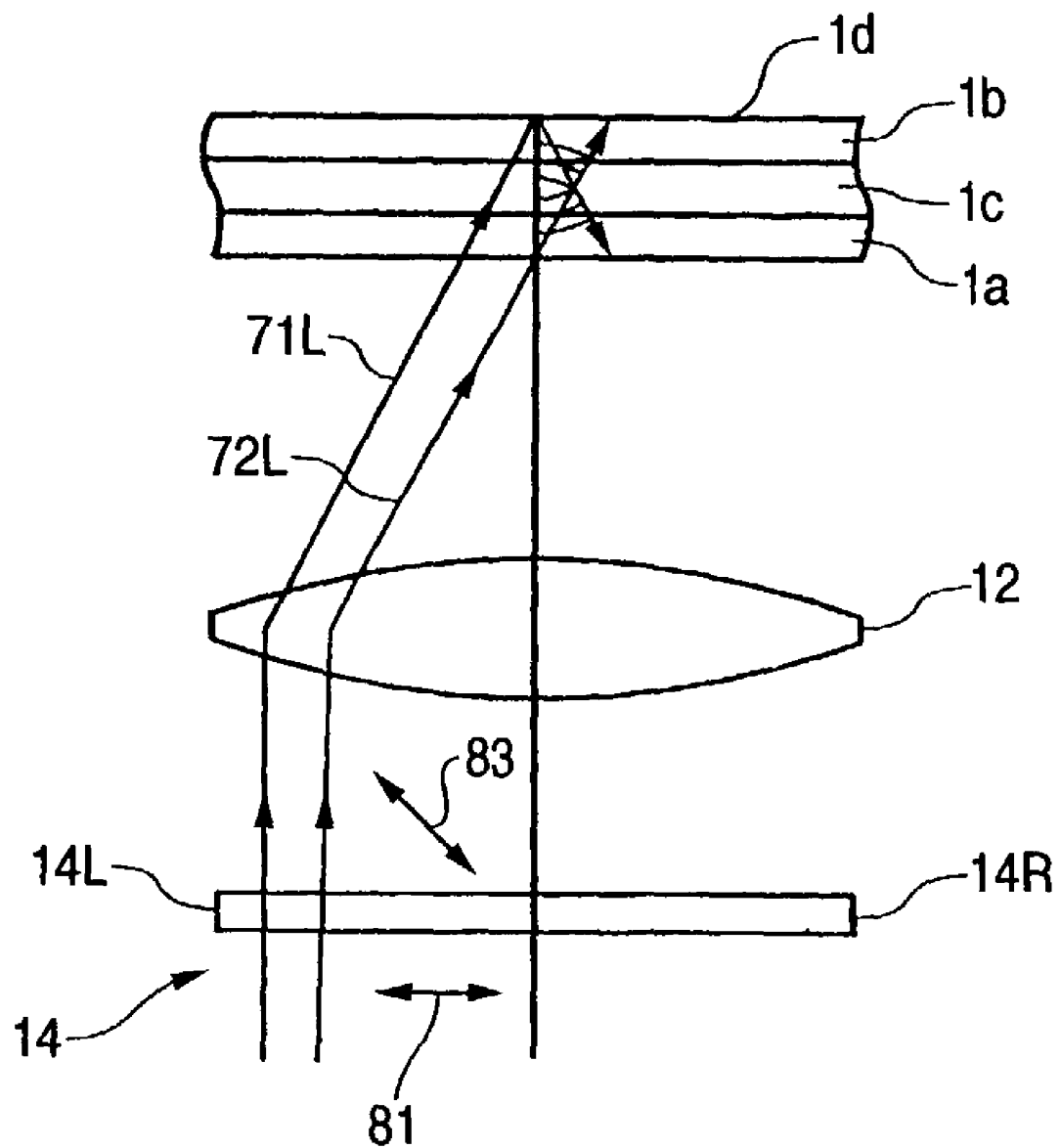
FIG. 15 is an explanatory figure showing a laser beam state during recording.
Figure 16:
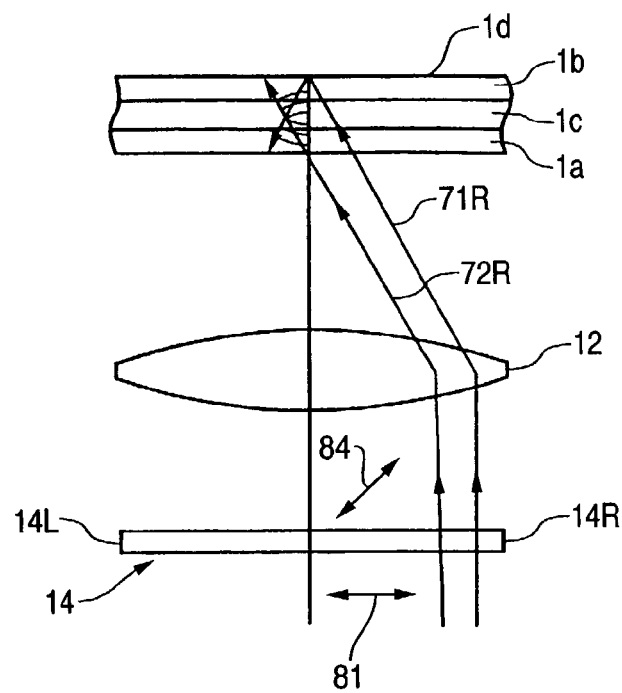
FIG. 16 is an explanatory figure showing a laser beam state during recording.

FIGS. 15 and 16 are explanatory views showing a state of a laser beam during recording. In the figures, the symbol shown at reference 81 represents a P-polarized light, the symbol shown at reference 83 an A-polarized light and the symbol shown at reference 84 a B-polarized light. In FIG. 15, the information light 71L, having passed the rotatory plate 14L of the two-split optical rotatory plate 14, turns into an A-polarized light with which the optical disk recording medium 1 is irradiated through the objective lens 12. This light passes through the holographic recording layer 1*c* and converged onto the reflection film 1*d* and, at the same time, reflected upon the reflection film 1*d* and again travels back into the holographic recording layer 1*c*.

Meanwhile, the recording reference light 72L, having passed the rotatory plate 14L of the two-split optical rotatory plate 14, turns into an A-polarized light that with which the optical disk recording medium 1 is irradiated through the objective lens 12. This light once converges on an incident surface of the holographic recording layer 1*c* and then, while diverging passes through the holographic recording layer 1*c*. Then, in the holographic recording layer 1*c*, interference takes place between the A-polarized information light 71L reflected upon the reflection film 1*d* and the A-polarized recording reference light 72L traveling toward the reflection film 1*d*, thereby forming an interference pattern within the holographic recording layer in a three-dimensional fashion. Accordingly, when the emission light output of the laser source 25 is raised to a high output, the interference pattern is recorded stereoscopically within the holographic recording layer 1*c*.

Meanwhile, as shown in FIG. 16, the information light 71R, having passed the rotatory plate 14R of the two-split optical rotatory plate 14, turns into a B-polarized light that with which the optical disk recording medium 1 is irradiated through the objective lens 12. This light passes through the holographic recording layer 1*c*, converges on the reflection film 1*d* and is reflected upon the reflection film, again traveling back into the holographic recording layer 1*c*. Meanwhile, the recording reference light 72R, having passed the rotatory plate 14R of the two-split optical rotatory plate 14, turns into a B-polarized light that is irradiated by the objective lens 12 onto the optical disk recording medium 1. This light once converges on an incident surface of the holographic recording layer 1*c* and then passes, while diverging, through the holographic recording layer 1*c*. Then, in the holographic recording layer 1*c*, interference takes place between the B-polarized information light 71R reflected upon the reflection film 1*d* and the B-polarized recording reference light 72R traveling toward the reflection film 1*d*, thereby forming a three-dimensional interference pattern. When the emission-light output of the laser source 25 is raised to a high output, the interference pattern is recorded stereoscopically within the holographic recording layer 1*c*.

In the holographic recording form to an optical disk recording medium of the invention shown in FIGS. 15 and 16, the holographic recording layer 1*c* is irradiated with information light and recording reference light 72R at the same side thereof, such that the information light and the recording reference light at their axes are arranged on the same line. Also, by carrying out recording operations in plurality of times to the holographic recording layer 1*c* at the same recording position of the information recording area while changing the modulation pattern of recording reference light, it is possible to multiplex-record pieces of information by means of phase coding multiplex.

In this manner, with the recording apparatus for recording a hologram on an optical disk recording medium of the invention, a reflection type (Lippmann type) hologram is formed in the holographic recording layer 1*c*. Incidentally, the A-polarized information light 71L and the B-polarized recording reference light 72R are orthogonal in polarization direction and hence not cause interference. Similarly, the B-polarized information light 71R and A-polarized recording reference light 72L are orthogonal in polarization direction and hence not cause interference. Namely, extra interference fringe is prevented from occurring during recording a hologram, providing a merit to prevent against SN (signal-to-noise) ratio lowering.

Furthermore, in the recording apparatus, irradiated to the optical disk recording medium 1 is irradiated with information light in a manner converged on a boundary plane between the holographic recording layer 1*c* and the substrate 1*e*, which reflects upon the reflection film 1*d* of the optical disk recording medium 1 and returns toward the objective lens 12. The return light, similarly to that upon servo, enters the four-split photodetector 29. Accordingly, by utilizing the information light incident on the four-split photodetector 29, focus servo during recording is possible to carry out in the address servo area 6.

Incidentally, recording reference light converges on the incident surface of the holographic recording layer 1*c* of the optical disk recording medium 1 to radiate divergent light to the embossed pits of the servo area 6. This light, even if reflected upon the reflection film 1d of the optical disk recording medium 1 and returned toward the objective lens 12, does not focus on the four-split photodetector 29. Thus, it is impossible to utilize it for focus servo.

Incidentally, in the recording apparatus, it is possible to desirably select a size of the region where one interference pattern due to the information light and the reference light is to be recorded in a stereoscopic fashion (holographic forming region) in the holographic recording layer 1c by moving the convex lens 16 forward and backward or changing the magnification thereof.

Explanation will be now made on the operation of upon reproducing recorded information, with reference again to FIG. 14. During reproduction, all the pixels of the space optical modulator 18 are put on. Meanwhile, the controller 50 provides the phase space optical modulator 17 with the same information as the modulation pattern, upon recording, of a recording reference light of information to be reproduced. The phase space optical modulator 17 spatially modulates the phase of a passing laser beam, according to the same information as the modulation pattern, of upon information recording, provided by the controller 50. This spatially modulates the phase of laser beam to generate a reproducing reference light.

The laser light emitted from the laser source 25 is switched to a low output for reproduction. The controller 50 predicts a timing the laser beam having passed objective lens 12 is to pass the holographic area 7, on the basis of the servo clock CK reproduced from the reproduction signal RF. While the laser beam from the objective lens 12 passes the holographic area 7, the above setting of upon reproduction is held. Accordingly, while the laser beam from the objective lens 12 passes the holographic recording area 7, tracing servo control only is carried out without effecting focus servo control and tracking servo control.

As was shown in FIG. 14, the P-polarized laser beam emitted from the laser source 25 is changed by the collimator lens 24 into a collimated laser beam that transmits through the beam splitter 30 and enters the beam splitter 23, part of whose light amount is reflected by the half mirror 23a onto the photodetector 26, thereby effecting automatic light amount adjustment. The laser beam having passed the half mirror 23a enters the prism block 19. Part of the light incident on the prism block 19 is reflected upon the half mirror 19b. The reflected light is reflected by the total reflection mirror 19a to pass the phase space optical modulator 17, whereupon the phase of light is spatially modulated according to a predetermined modulation pattern, thus being turned into a reproducing reference light.

The reproducing reference light passes the convex lens 16 and is changed into a converging light. The reproducing reference light, in one part, is reflected upon the half mirror 15a of the prism block 15, to pass the two-split optical rotatory plate 14. Herein, the light having passed the rotatory plate 14L of the two-split optical rotatory plate 14 is rotated +45 degrees in polarization direction into an A-polarization light while the light having passed the rotatory plate 14R is rotated −45 degrees in polarization direction into a B-polarization light. The optical disk recording medium 1 is irradiated with the reproducing reference light having passed the two-split optical rotatory plate 14 through the objective lens 12 where it converges in front of the holographic recording layer 1c and then passes, while diverging, through the holographic recording layer 1c.

Figure 17:
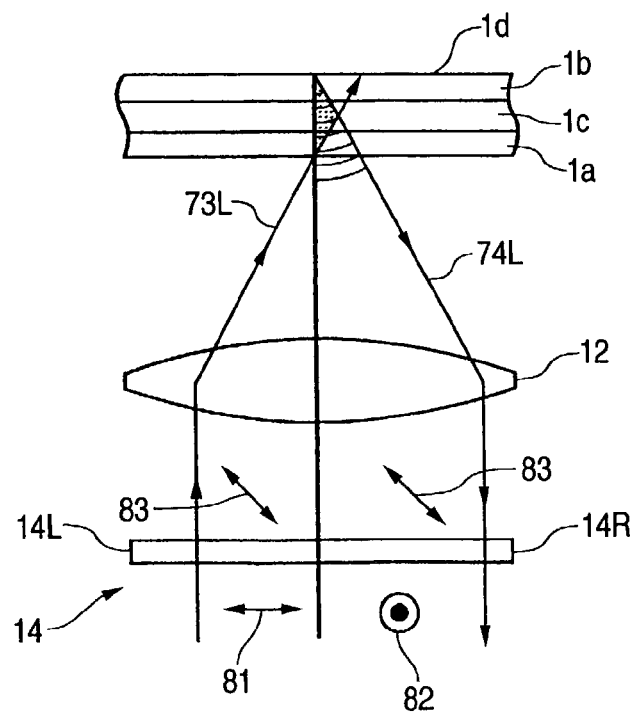
FIG. 17 is an explanatory figure showing a laser beam state during reproducing.
Figure 18:
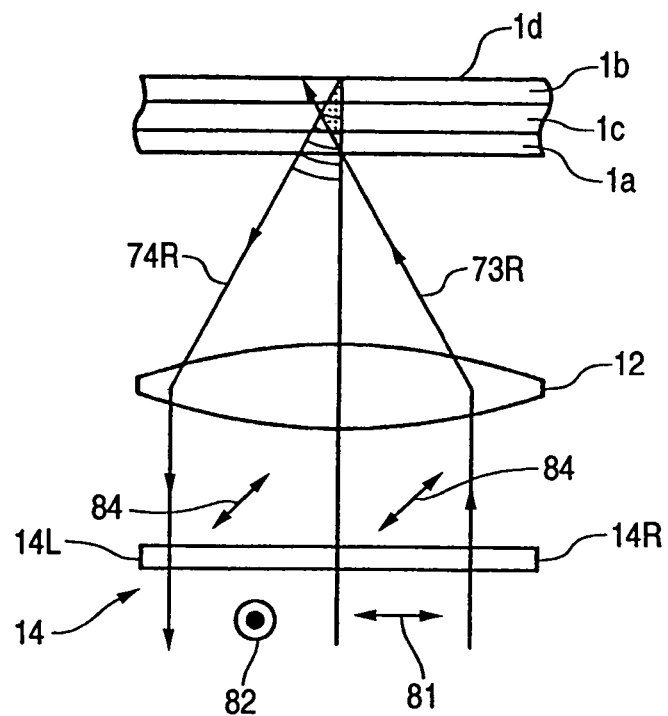
FIG. 18 is an explanatory figure showing a laser beam state during reproducing.
Figure 19:
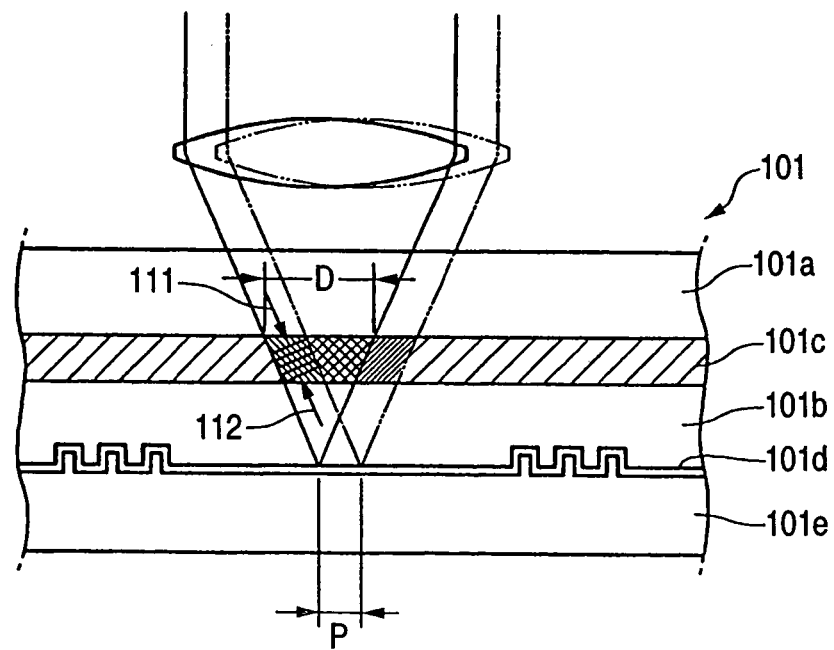
FIG. 19 is a fragmentary sectional view magnifying a part of an optical disk recording medium utilizing the conventional volume holography.

In FIGS. 17 and 18, the symbol shown at reference 81 represents a P-polarized light, the symbol shown at reference 82 an S-polarized light and the symbol shown at reference 83 an A-polarized light, and the symbol shown at reference 84 an B-polarized light. In FIG. 17, the reproducing reference light 73L, having passed the rotary plate 14L of the two-split optical rotatory plate 14, turns into an A-polarized light with which the optical disk recording medium 1 is irradiated through the objective lens 12. This light converges in front of the holographic recording layer 1c and then passes, while diverging, through the holographic recording layer 1c. As a result, a reproduced light 74L is caused from the holographic recording layer 1c which corresponds to the information light 71L of upon recording. The reproduced light 74L travels toward the objective lens 12 and is changed into a collimated laser beam by the objective lens 12, again passing the two-split optical rotatory plate 14 to turn into an S-polarized light.

Meanwhile, as was shown in FIG. 18, the reproducing reference light 73R, having passed the rotary plate 14R of the two-split optical rotatory plate 14, turns into a B-polarized light with which the optical disk recording medium 1 is irradiated through the objective lens 12. This light converges in front of the holographic recording layer 1c and then passes, while diverging, through the holographic recording layer 1c. As a result, a reproduced light 74R is caused from the holographic recording layer 1c which corresponds to the information light 71R of upon recording. The reproduced light 74R travels toward the objective lens 12 and is changed into a collimated laser beam by the objective lens 12, again passing the two-split optical rotatory plate 14 to turn into an S-polarized light.

The reproduced light, having passed the two-split optical rotatory plate 14, enters the prism block 15, part of which transmits through the half mirror 15a. The reproduced light having transmitted the half mirror 15a is reflected by the total reflection mirror 15b, to pass the space optical modulator 18 whose pixels are all put on, part of whose light is reflected upon the half mirror 19b of the prism block 19 to enter a CCD array 20. On the CCD array 20 is focused an on/off pattern of upon recording due to the space optical modulator 18. By detecting this pattern, reproduced is the information recorded on the optical disk recording medium 1.

Incidentally, where a plurality of pieces of information are recorded in the holographic recording layer 1c by changing the modulation patterns of recording reference light, reproduced is only the information having been read out by the reproducing reference light having the same modulation pattern as the modulation pattern of recording reference light. FIGS. 17 and 18 are the example in which the axes of reproducing reference light and reproduced light are on the same line wherein irradiating with a reproducing reference light and focusing a reproduced light are on the same side of the holographic recording layer 1c.

Furthermore, part of the reproduced light enters the four-split photodetector 29, similarly to the return light of upon servo during recording. Consequently, using the light entered the four-split photodetector 29, focus servo can be carried out in the servo area 6 during reproduction. Incidentally, concerning the reproducing reference light, it once converges in front of the holographic recording layer 1c of the optical disk recording medium 1 and turns to a divergent light in the holographic recording layer 1c, it is not focused on the four-split photodetector 29 even if reflected by the reflection film 1d of the optical disk recording medium 1 and returned toward the objective lens 12.

In carrying out the invention, tracing servo control is carried out for the optical head such that the hologram-forming laser beam having a wavelength $\lambda_2$ emitted from the laser source 25, as a laser beam irradiating the optical disk recording medium 1 from the optical head, has an irradiation position tracing the moving information recording position of the optical disk recording medium 1 for a time required for exposure to light, without positional deviation. For this reason, there is a need for a tracing laser beam having a wavelength $\lambda_1$ to be emitted from the laser source 33 that irradiate the servo clock pits SCK1-3 provided in the servo area 6 to thereby detect a positional deviation, in a moving direction of the optical disk recording medium, between an information recording position and a hologram-forming laser-beam irradiating position. The optical head 11 for the optical disk recording medium 1 of the invention is structured for emitting a coherent laser beam having a plurality of wavelengths, e.g. wavelength $\lambda_1$ and wavelength $\lambda_2$.

The combination of wavelengths, or wavelength $\lambda_1$ and wavelength $\lambda_2$, is a combination of $\lambda_1$=780 nm and $\lambda_2$=532 nm, a combination of $\lambda_1$=780 nm and $\lambda_2$=650 nm, a combination of $\lambda_1$=650 nm and $\lambda_2$=525 nm, a combination of $\lambda_1$=650 nm and $\lambda_2$=405 nm, a combination of $\lambda_1$=780 nm and $\lambda_2$=390 nm, and so on. Although FIG. 14 exemplified the apparatus having two laser source 25, 33 different in wavelength, it is possible to use, in place of the two kinds of laser sources, a variable-wavelength laser source device capable of emitting a plurality of wavelengths of laser beams comprising a combination of a single laser light source and a wavelength selector element, such as by a prism or a diffraction grating, a variable-wavelength laser source unit using a laser beam source and a nonlinear optical system for changing the wavelength of the emission light from that laser beam source.

In sequentially recording holograms on the information recording positions of holographic recording area 7 of the optical disk recording medium 1, there is a need for the hologram-forming laser beam to follow an information recording position without causing positional deviation while the optical-disk recording medium 1 moves a distance of at least 200 µm, and to continue irradiation for fixing the holograms in the holographic recording layer.

When the optical disk recording medium 1 has moved 200 µm to complete the holographic recording, the optical head is rapidly returned by 200 µm–α (where α is the distance between adjacent information recording positions) in a reverse direction to the moving direction of the optical disk recording medium 1. In order to record a new hologram on the next information recording position of the optical recording medium in the similar recording form, irradiation to the next information recording position is started with a hologram-forming laser beam. While the optical disk recording medium 1 moves 200 µm, holographic recording is correctly made while tracing the relevant information recording position by the hologram-forming laser beam.

Such holographic recording operation is sequentially repeated until the next servo area is reached. While the optical head passes the servo area 6, focus servo control and tracking servo control are carried out as described in the foregoing. When moving to the information recording area of the next sector, holographic recording operation as in the above is repeated while carrying out tracing servo control. Thus, holograms are recorded, sequentially, to the information recording positions of the information recording area of the next sector.

As explained above, according to the invention, because a holographic recording spot on one track of the holographic recording area and a holographic recording spot on a track adjacent thereto are recorded in circumferentially different positions, at least one holographic recording spot is formed on each track. Holographic recording and reproducing operations are not in a burst fashion but in a continuous process.

Moreover, according to the recording method of the invention, recording is made such that, provided that the holographic recording spot has a diameter D and a multiplex number of holographic recording spots is m, a pitch P between adjacent holographic recording spots is P=D/m. Consequently, it is possible to efficiently record a hologram with high density to a holographic recording area of an optical disk recording medium, thus achieving the density increase of holographic recording.

What is claimed is:

1. A method for recording as a hologram, an interference pattern due to interference of an information light and recording reference light emitted from the optical head, on an optical disk recording medium having a holographic recording layer and tracks extended along a circumferential direction at a predetermined interval in a radial direction, the method comprising the step of:

recording holographic recording spots in the holographic recording layer such that a holographic recording spot on one track of the holographic recording spot on a track adjacent thereto are recorded in circumferentially different positions and, provided that the holographic recording spot has a diameter D and a present multiplex number of holographic recording spots is m, a pitch P between adjacent holographic recording spots is P=D/m;

wherein the multiplex number m is a maximum multiplex number, which is determined by a reproduced light intensity of the recorded hologram;

wherein the hologram is recorded in the holographic recording layer such that a spacing between a holographic recording spot recorded on one track and a holographic recording spot recorded on a track adjacent thereto is substantially P and that a holographic recording spot recording on the one track and a holographic recording spot recorded on a track distant by m tracks therefrom are deviated by P/2 in circumferential position.

2. The method according to claim 1, wherein the optical disk recording medium is radially divided into a plurality of zones, the hologram being recorded in the holographic recording layer such that the number of holographic recording spots recorded circumferentially of the holographic recording layer of one of the zones close to an outer periphery is greater than the number of holographic recording spots recorded circumferentially of the holographic recording area of one of the zones close to an inner periphery.

3. The method according to claim 1, wherein the optical disk recording medium having a layer formed servo areas and the holographic recording layer is located above the layer formed servo areas, and wherein the servo area is formed with a clock generating pit, and with reference to the clock generating pit a signal is generated to determined a recording timing for each track.

4. The method of claim 1, wherein an irradiation position on the holographic recording layer of the information light and the recording reference light is moving to follow the movement of the optical disk recording medium for a predetermined time.

5. The method according to claim 4, detecting a positional deviation between an information recording position of the holographic recording layer and the irradiation position, and moving the irradiation position on the basis of the positional deviation.

* * * * *

UNITED STATES PATENT AND TRADEMARK OFFICE
CERTIFICATE OF CORRECTION

PATENT NO. : 7,706,233 B2  Page 1 of 1
APPLICATION NO. : 10/393517
DATED : April 27, 2010
INVENTOR(S) : Hideyoshi Horimai et al.

It is certified that error appears in the above-identified patent and that said Letters Patent is hereby corrected as shown below:

Column 18, line 15, after "direction" insert --formed--.

Column 18, line 20, delete "of the" and insert --and a--.

Column 18, line 23, delete "present" and insert --preset--.

Column 18, line 35, delete "recording" and insert --recorded--.

Column 18, line 54, delete "determined" and insert --determine--.

Signed and Sealed this

Twenty-second Day of June, 2010

David J. Kappos
*Director of the United States Patent and Trademark Office*